(12) United States Patent
Shevade et al.

(10) Patent No.: US 11,048,538 B2
(45) Date of Patent: Jun. 29, 2021

(54) AUTONOMOUS CELL-BASED CONTROL PLANE FOR SCALABLE VIRTUALIZED COMPUTING

(71) Applicant: Amazon Technologies, Inc., Seattle, WA (US)

(72) Inventors: Upendra Bhalchandra Shevade, Washington, DC (US); Diwakar Gupta, Seattle, WA (US); Michael Brooke Furr, Washington, DC (US); Nishant Mehta, Bellevue, WA (US); Kevin P. Smith, Fairfax, VA (US)

(73) Assignee: Amazon Technologies, Inc., Seattle, WA (US)

( * ) Notice: Subject to any disclaimer, the term of this patent is extended or adjusted under 35 U.S.C. 154(b) by 326 days.

(21) Appl. No.: 15/905,681

(22) Filed: Feb. 26, 2018

(65) Prior Publication Data
US 2019/0265996 A1 Aug. 29, 2019

(51) Int. Cl.
*G06F 9/455* (2018.01)
*G06F 9/48* (2006.01)
*G06F 9/50* (2006.01)

(52) U.S. Cl.
CPC .......... *G06F 9/45558* (2013.01); *G06F 9/485* (2013.01); *G06F 9/5077* (2013.01); *G06F 2009/4557* (2013.01); *G06F 2009/45595* (2013.01); *G06F 2209/505* (2013.01)

(58) Field of Classification Search
CPC ..... G06F 9/45558; G06F 9/485; G06F 9/5077
See application file for complete search history.

(56) References Cited

U.S. PATENT DOCUMENTS

| 9,251,384 | B1* | 2/2016 | Potlapally | G06F 21/85 |
| 9,485,323 | B1* | 11/2016 | Stickle | H04L 67/32 |
| 9,491,111 | B1* | 11/2016 | Roth | G06F 21/645 |
| 9,495,234 | B1* | 11/2016 | Hamman | G06F 11/079 |
| 10,127,068 | B2 | 11/2018 | Liguori et al. | |
| 2012/0110055 | A1* | 5/2012 | Van Biljon | G06Q 30/04 709/201 |
| 2012/0151476 | A1* | 6/2012 | Vincent | G06F 9/45558 718/1 |
| 2013/0346969 | A1* | 12/2013 | Shanmuganathan | G06F 9/4856 718/1 |
| 2015/0363224 | A1* | 12/2015 | Argenti | G06F 9/5027 718/1 |

OTHER PUBLICATIONS

U.S. Appl. No. 16/196,723, filed Nov. 20, 2018, Anthony Nicholas Liguori, et al.

(Continued)

*Primary Examiner* — Tammy E Lee
(74) *Attorney, Agent, or Firm* — Robert C. Kowert; Kowert, Hood, Munyon, Rankin & Goetzel, P.C.

(57) ABSTRACT

A number of cells of a control plane of a virtualized computing service are set up, including a first cell with one or more request processing nodes, a local instance of a data store, and metadata indicating a set of virtualization hosts. A request processer transmits a request for a virtual machine to the first cell. A request processor of the cell initiates a workflow to launch the virtual machine using a virtualization host; the workflow includes storing a record of the request in the local instance of the data store.

20 Claims, 13 Drawing Sheets

(56) References Cited

OTHER PUBLICATIONS

U.S. Appl. No. 16/017,886, filed Jun. 25, 2018, Upendra Bhalchandra Shevade.
Amazon Web Services, "Amazon Elastic Compute Cloud: User Guide for Linux Instances," Latest Version update 2018, pp. 1-884.
Amazon Web Services, "Amazon Elastic Container Service: Developer Guide" API Version, Nov. 13, 2014, pp. 1-386.
Amazon Web Services, "AWS Lambda: Developer Guide" 2018, pp. 1-539.
Amazon, "Announcing Amazon EC2 Bare Metal Instances (Preview)", Retrieved from URL: https://aws.amazon.com/about-aws/whats-new/2017/11/announcing-amazon-ec2-bare-metal-instances-preview/, pp. 1-4.
Brendan Gregg's Blog, "AWS EC@ VIrtualization 2017: Introducing Nitro", Retrieved from URL: http://www.brendangregg.com/blog/2017-11-29/aws-ec2-virtualization-2017.html, pp. 1-11.
U.S. Appl. No. 15/199,497, filed Jun. 30, 2016, Anthony Nicholas Liguori, et al.
U.S. Appl. No. 15/199,489, filed Jun. 30, 2016, Anthony Nicholas Liguori, et al.
U.S. Appl. No. 15/199,479, filed Jun. 30, 2016, Anthony Nicholas Liguori, et al.

* cited by examiner

AUTONOMOUS CELL-BASED CONTROL PLANE FOR SCALABLE VIRTUALIZED COMPUTING

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more "guest" virtual machines hosted by the single virtualization host. Each such virtual machine may represent a software simulation acting as a distinct logical computing system that provides users with the illusion that they are the sole operators of a given hardware computing resource, while also providing application isolation and security among the various virtual machines. Instantiating several different virtual machines on the same host may also help increase the overall hardware utilization levels at a data center, leading to higher returns on investment.

A network-accessible service that provides virtualized computing functionality may have to manage hundreds of thousands, or even millions, of virtual machines concurrently. Some of the virtual machines, established for long-running client applications, may remain operational for weeks, months, or years. Other virtual machines may be short-lived—e.g., lasting for just a few minutes or seconds to perform a specific task on behalf of a client. The demand for different types of virtual machine may vary substantially over time. The portion of a virtualized computing service which handles administrative actions, such as the provisioning of physical resources, networking configuration and the like, may be referred to as the control plane of the service; the portion used primarily for client applications and data may be referred to as the data plane. Designing a control plane that can efficiently handle a workload to manage large, dynamically changing mixes of virtual machines with widely differing functional and performance requirements remains a non-trivial technical challenge.

Figure 1:
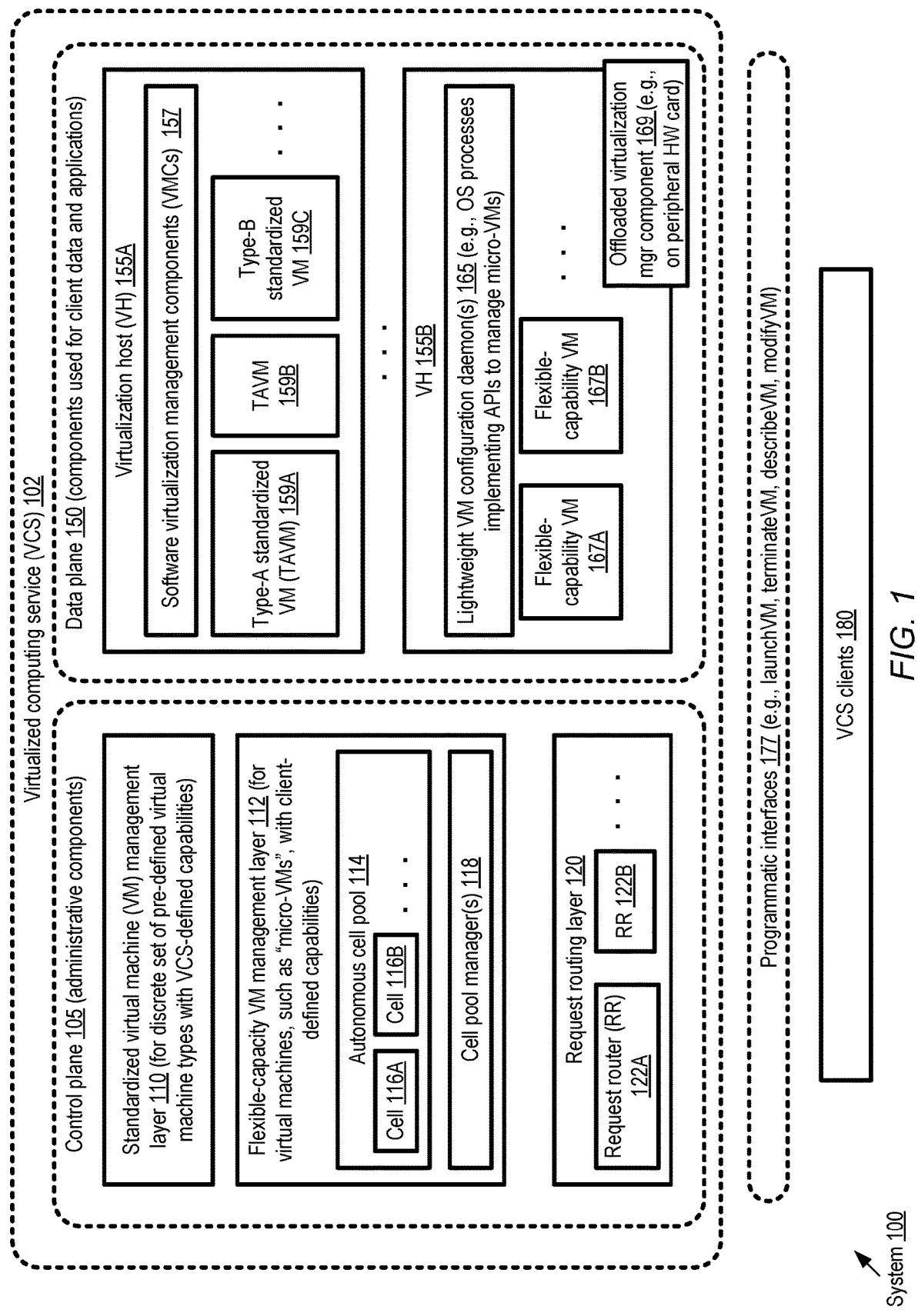
FIG. 1 illustrates an example system environment in which a virtual computing service whose control plane comprises a plurality of autonomous cells for enhanced scalability and availability may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for enhancing the scalability and availability of a virtualized computing service (VCS) using a control plane that comprises a layer with a pool of autonomous cells, each configured to manage a set of virtual machines independently of other cells, are described. As one skilled in the art will appreciate in light of this disclosure, certain embodiments may be capable of achieving various advantages, including some or all of the following: (a) improving the overall responsiveness of a virtualized computing service with respect to virtual machine configuration requests, especially pertaining to short-lived or "micro" virtual machines, despite the potential variation of demand for virtual machines over time, (b) enabling the virtualized computing service to fulfill virtual machine requests indicating arbitrary combinations of performance requirements (e.g., for processing power, memory, storage or networking), even in scenarios in which the requirement combinations do not match the specific capabilities of a set of pre-defined categories of virtual machines of the service, and/or (c) reducing the probability that a failure within the control plane affects the virtual machines of any given client of a virtualized computing service.

The resources and artifacts of a network-accessible virtualized computing service may be logically subdivided into at least two high-level groups in various embodiments: a control plane and a data plane. The control plane may be used primarily for administrative operations, such as provisioning the hardware to be used for virtual machines, establishing and maintaining network connectivity, monitoring various components to ensure availability and failure resilience at desired levels, and so on. The data plane may be used primarily for running client applications on client-requested virtual machines, storing and transmitting client application data, and so on. In some embodiments, the control plane may be implemented primarily using one set of computing devices, while the data plane may be implemented primarily using a different set of computing devices, e.g., in an attempt to reduce the probability of failures in one plane from affecting the other. In at least some embodiments, a given computing device of a virtualized computing service may comprise components of both the control plane and the data plane—e.g., as discussed below in further detail, an agent of a control plane cell may run on a virtualization host at which a client-requested virtual machine is instantiated.

When requesting a virtual machine (VM), a client of a VCS may have to specify various performance-related characteristics of the requested VM. This may be done in a variety of ways in different embodiments. In some embodiments, a VCS may enable clients to select from among a discrete set of standardized pre-defined configurations when requesting a particular virtual machine. Each such pre-defined configuration may, for example, indicate a computing capacity (expressed, for example, in terms of virtual CPUs, where the definition of a virtual CPU may be specified by the VCS), a memory capacity, a storage capacity, a networking capacity, and the like. In other embodiments, a VCS may provide more flexibility with regard to virtual machine capabilities: e.g., a client may specify their own combination of performance requirements with respect to processing, memory, storage, networking and the like for a given set of one or more virtual machines. In at least some embodiments, both pre-defined virtual machine types and client-specified flexible-capacity virtual machines may be supported. Virtual machines whose capabilities are specified by clients, and do not necessarily correspond to pre-defined standardized configurations supported by the VCS, may be referred to as "flexible" or "flexible-capability" virtual machines in some embodiments. Virtual machines may also be referred to as "compute instances" in various embodiments. In some embodiments, one or more categories of compute instances supported by the VCS may not necessarily comprise full-fledged virtual machines as such. For example, in one embodiment, a "bare-metal" compute instance supported by the VCS may comprise various processes of an operating system that directly control at least a portion of the hardware of the host being used, without utilizing virtualization (although a small subset of the hardware functionality may be virtualized in some cases). In such an embodiment, a hypervisor dedicated to virtualization management may not be required. For example, the bare-metal compute instance may include functionality to host virtual machines. In other embodiments, at least some bare-metal compute instances may comprise a full-fledged virtual machine, with most or all hardware functionality being virtualized.

In some embodiments, a VCS control plane may comprise several layers. One layer of the VCS control plane may comprise a plurality of autonomous cells in various embodiments, with each cell responsible for administering a respective set of virtual machines without interacting with any other cell (at least during normal operation). Such a control plane layer may be referred to as a "cell-based" layer in various embodiments. As discussed below in further detail, in some embodiments a given cell may comprise a collection of interacting components including one or more request processing nodes, one or more reconciliation or anti-entropy nodes, a log-based persistent data store for storing state information, and metadata indicating a group of virtualization hosts used for the virtual machines managed using the cell. In one such embodiment, the cell-based layer may be used primarily for administering relatively small (in terms of resource requirements) and/or flexible virtual machines. In other embodiments, the cell-based control plane layer may be used for additional types of virtual machines, including at least some standardized virtual machines supported by the VCS. In one embodiment, a cell-based control plane layer may be used for all virtual machines instantiated at the VCS. In some embodiments, the virtualization hosts being managed may be considered elements of the cell.

In at least one embodiment, a VCS control plane may comprise a layer which is intended primarily for administering pre-defined or standardized virtual machines, e.g., in addition to a cell-based layer used primarily for flexible virtual machines. In some embodiments, the administrative responsibilities of a multi-layer VCS control plane may be divided based primarily on virtual machine performance capabilities rather than flexibility. For example, in one such embodiment, virtual machines whose performance needs (e.g., with respect to some combination of processing, memory, storage, or networking) are less than a threshold may be managed by a cell-based layer of the control plane, regardless of whether the virtual machines are instances of pre-defined standardized categories or not, while other virtual machines may be managed using a different layer which does not comprise cells. In various embodiments, a VCS may also include other layers, such as a request routing layer (comprising one or more request routers responsible for receiving client requests for administering virtual machines, and directing them to the appropriate cell or other control plane component), a control plane management layer (which may for example include a cell pool manager responsible for configuring the cells, and/or other components for administering the control plane itself), and so on.

According to at least some embodiments a system may comprise one or more request routers of a VCS, and a plurality of autonomous cells of a control plane layer of the VCS. A given request router may be implemented at a first set of one or more computing devices, and a given cell may be implemented using a second set of one or more computing devices in one such embodiment. In another embodiment, a shared set of computing devices may be used for both request routing and control plane cells. In various embodiments, a given cell may comprise at least (a) one or more request processing nodes (RPNs), (b) a local instance of a persistent log-based data store, and (c) metadata identifying a group of one or more virtualization hosts to be administered by the first autonomous cell. In at least one embodiment, one or more of the virtualization hosts may comprise an offloaded virtualization manager component, which may for example be implemented at a card accessible via a peripheral interconnect from the processors of the corresponding host. The offloaded virtualization management component may implement a substantial portion of the administration, configuration and low-level input/output tasks of virtual machines using hardware rather than software, so as to enable a higher proportion of the host's resources to be dedicated to client-requested virtual machines than if virtualization management were done primarily in software in various embodiments.

In one embodiment, a particular request router may determine, based at least in part on a computational demand indicator of a request for a virtual machine, that at least a subset of administrative operations associated with that virtual machine is to be processed at the control plane layer comprising the plurality of autonomous cells. The request may have been received from a client of the VCS via a programmatic interface in various embodiments, such as an application programming interface (API), a command-line tool, a web-based console, a graphical user interface or the like. The request router may further select, based at least in part on a set of properties of the requested VM, a particular cell of the cell-based layer as the cell responsible for the requested virtual machine. For example, in one embodiment, a requested networking-related property of the VM (such as a subnet or network address) may be one of the factors used to select the particular cell; other properties of the request and/or the cells, such as the source from which the VM request was received, resource usage metrics of various individual cells, the available resource capacities of various individual cells, and the like may be used to select the cell. In one embodiment, for example, a cell may only be selected for a particular VM request if the cell's available resource capacity (along one or more dimensions such as computing, memory, storage, or networking) exceeds some selected threshold. If the selected cell has more than one request processing node (RPN), a particular RPN may also be selected at the request routing layer in some embodiments, e.g., using a random selection algorithm or a request-property-to-RPN mapping algorithm. A message requesting instantiation of the virtual machine (e.g., an internal representation of the client-submitted request for the VM) may be transmitted from the request router to an RPN of the selected cell in various embodiments.

In various embodiments, the RPN that receives the request from the request router may initiate at least a portion of a workflow to configure the requested VM on one of the virtualization hosts managed by the cell. The workflow may comprise several different operations in some embodiments. In one embodiment, for example, the workflow may comprise storing, in the local instance of the persistent log-based data store of the cell, a record indicating the VM request. As discussed below, the local instance of the persistent data store may be used as the repository of state change information with respect to VMs managed by the cell in various embodiments, as well as a source to be used to help initiate rectification operations if one or more VMs managed by the cell are found to be in unexpected or unsatisfactory states. The rectification operations may, for example, initiate modifications to the states of the one or more VMs, in an effort to make the VMs attain their respective expected states. In some embodiments, the workflow may also include utilizing one or more components of a selected virtualization host, including for example an offloaded virtualization manager component, a daemon or process running on the host which implements an API for virtual machine configuration operations, and the like. In one embodiment, for example, the RPN may direct, to an agent or daemon on the virtualization host, an API call to launch the requested VM. The agent or daemon may attempt to instantiate the VM and provide a response to the RPN indicating the result of the attempt.

After a requested VM has been launched on a particular host using a particular cell of the control plane, during normal (non-failure) modes of operation, any additional administrative operations associated with that VM may be handled by that same cell in various embodiments. For example, if a request to modify the VM, terminate the VM, perform any other types of stage change of the VM, or obtain status information regarding the VM or is received by the VCS, it may be routed to and processed by the same cell that was used to instantiate the VM in such embodiments, with no interaction required with any other cell. The local instance of the persistent log-based data store may only be written to and accessed from within its own cell in various embodiments during normal operations; as a result, the state change information stored in the local instance may be made secure from corruption or overwriting by agents external to the cell. In the unlikely event that a failure occurs at any other cell, or if any other cell becomes temporarily disconnected from other parts of the VCS, no impact may be expected to the VM instantiated at the particular cell at which it was instantiated. For at least these reasons, individual cells of the VCS control plane may be described as being autonomous or independent with respect to one another in various embodiments. In at least some embodiments, even if a component of the cell that is managing a launched VM fails, that VM may continue its operations.

According to at least one embodiment, a control plane cell of a VCS may comprise one or more reconciliation nodes responsible for performing anti-entropy operations when certain types of unexpected or undesired states are detected. As mentioned earlier, in various embodiments a request processing node may store a representation of a VM configuration request, such as a request to launch a VM (and various parameters of the request), in the cell's local instance of a persistent data store. After storing such a representation or record, in some embodiments the RPN may then attempt to initiate the launch, e.g., by directing a synchronous API request to a virtualization host. A similar approach may be taken with respect to other types of configuration requests, such as VM termination requests or VM modification requests—a record of the request may be stored in the local data store instance, and then an attempt may be made to perform the requested operation. In the vast majority of cases, the requested operation may succeed, and the VM to which the operation was directed may reach a satisfactory state. However, it may sometimes be the case that a request issued by an RPN to perform a requested VM configuration operation does not succeed immediately, gets hung, or fails in an unexpected manner. A reconciliation node may perform a sequence of anti-entropy iterations in some embodiments to respond to such undesirable scenarios. If a reconciliation node determines that a fulfillment status of a VM configuration request does not meet a satisfaction criterion (e.g., if a VM for which a launch was requested has not started up as expected, if a VM whose termination was requested has not terminated cleanly, etc.), in some embodiments it may initiate one or more corrective or rectification operations (to modify the VM state, with the goal of attaining a desired/expected state) as part of its anti-entropy responsibilities. In order to determine whether an unsatisfactory fulfillment status has been reached, a reconciliation node may, for example, examine at least a portion of the local instance of the persistent store, transmit a query to a virtualization host, and/or interact with other components of the cell in various embodiments. The rectification operations may, for example, comprise issuing API calls to a virtualization host to instantiate a VM or terminate a VM, directing an RPN to re-attempt an operation that did not complete successfully, and so on in some embodiments.

The mapping between the individual components of a cell and physical or virtual computing devices may vary in different embodiments, and in some embodiments from one cell to another. For example, in one embodiment, if a given cell comprises N RPNs and P reconciliation nodes, a different physical host may be used for each of the RPNs, and a different physical host may be used for each of the reconciliation nodes, resulting in a total of (N+P) physical hosts for the RPNs and the reconciliation nodes of the cell. In other embodiments, more than one RPN may be instantiated on a given physical host, and/or more than one reconciliation node may be instantiated on a given physical host. A cell's local instance of the persistent data store may itself comprise a plurality of computing devices or hosts in some embodiments, e.g., arranged in a replication chain or directed acyclic graph (DAG) as discussed below. The metadata indicating the set of virtualization hosts being administered using a cell may be stored on one or more independent persistent storage devices accessible at the cell in some embodiments, or at a host being used for some other component of the cell. In various embodiments, a high degree of fault tolerance may be attained within a given cell. For example, multiple instances of various types of cell components may be configured, so that if a given cell component (such as an RPN or reconciliation node) fails, its responsibilities may be taken over by another component of the same type (or a new instance of that component type may be quickly brought online). A log structured data store with built-in fault tolerance (achieved using a replication chain or DAG as indicated above) may be used in various embodiments to strengthen cell availability.

The number of cells set up in the VCS control plane may vary over time in some embodiments. In at least one embodiment, a cell pool manager, implemented at one or more computing devices, may be responsible for setting up an initial number of cells, detecting events that may trigger changes to the number of cells, and configuring/decommissioning cells as needed. In one embodiment, such a cell pool manager may determine, based at least in part on an estimate of an expected rate of virtual machine state changes (e.g., VM launches, terminations, etc.) requested by clients of a VCS, that one or more additional cells for processing control plane operations are to be configured. The cell pool manager may accordingly instantiate establishment of the additional cells. The establishment of a given cell may for example comprise (a) configuring one or more request processing nodes, (b) configuring an instance of a persistent data store, and (c) identifying one or more virtualization hosts to be managed by the first cell. One or more reconciliation nodes to verify, based at least in part on contents of the instance of the persistent data store, the fulfilment status of virtual machine configuration change requests may also be established as part of the cell in various embodiments. An indication of the established cell may be provided to a request routing layer of the VCS by the cell pool manager in such embodiments. In some embodiments, a mapping function to be used to route VM configuration operation requests to particular cells may also be provided by the cell pool manager to the request routing layer of the VCS.

In at least one embodiment, a cell pool manager may utilize other layers of the VCS (e.g., a layer implementing standardized virtual machines) or other network-accessible services to provision one or more cell components—e.g., RPNs and/or reconciliation nodes may be set up using a respective standardized virtual machine, an instance of a log-structured data store may be set up using a storage service, and so on.

In addition to or instead of the expected rate of virtual machine state change requests, in some embodiments other factors may be considered when deciding to add (or remove) cells—e.g., resource usage metrics collected from various cells may be taken into account, failures associated with one or more cells may be taken into account, and so on. In effect, in at least some embodiments, new cells may be added to the pool of cells, using a well-tested and often-used set of operations for each new cell, as the anticipated workload of the VCS increases. Similarly, in the event that a sustained reduction in the number of VMs handled concurrently is detected, the number of cells may be reduced in various embodiments. As a result of using the cell-based architecture, the VCS as a whole may be scaled up and down in various embodiments without having to rely on modifications to a monolithic control-plane component which could potentially affect existing client applications.

Example System Environment

FIG. 1 illustrates an example system environment in which a virtual computing service whose control plane comprises a plurality of autonomous cells for enhanced scalability and availability may be implemented, according to at least some embodiments. As shown, system 100 may comprise various resources of a virtualized computing service (VCS) 102, logically divided into a control plane 105 (used primarily for administrative operations) and a data plane 150 (used primarily for client data and applications). In the depicted embodiment, the VCS 102 may implement one or more programmatic interfaces 177, such as a set of APIs, a web-based console, a command-line tool, or a graphical user interface, enabling VCS clients to submit various types of requests and receive corresponding responses. For example, commonly used APIs with respect to virtual machine configurations may include "launchVM" (to instantiate or start a VM), "terminateVM" (to end or kill an existing VM), "describeVM" (to obtain information about properties of an existing VM), and "modifyVM" (to change various properties of an existing VM, such as for example the limits on computing, memory or storage being imposed on the VM) in the depicted embodiment. Requests such as launchVM, terminateVM and modifyVM, which may require respective sets of writes of VM state information, may be referred to collectively as VM state change requests in various embodiments.

The control plane 105 may comprise several layers and/or subsystems in the depicted embodiment, including for example a standardized VM management layer 110, a flexible-capacity VM management layer 112, and a request routing layer 120. The standardized VM management layer 110 may be employed primarily for administering VMs that belong to a discrete set of pre-defined virtual machine types with VCS-defined capabilities in the depicted embodiment; examples of such pre-defined categories are provided in FIG. 2 and discussed below in further detail.

The flexible-capacity VM management layer 112 may comprise a pool 114 of autonomous cells 116 (e.g., cell 116A, cell 116B etc.) and one or more cell pool managers 118 in the depicted embodiment. A flexible-capacity VM management layer of the kind shown in FIG. 1 may also be referred to as a cell-based layer of the control plane in various embodiments. Layer 112 may be intended primarily for administering virtual machine such as so-called "micro-VMs" which may require very few resources or may exist for very short durations in the depicted embodiment. In at least some embodiments, one or more resource-based thresholds may be defined for determining whether a given requested VM is to be considered a "micro-VM" and managed using the cell-based layer 112. For example, in one embodiment, if a specified demand of a requested VM is less than a particular threshold with respect to a pre-defined combination of processing, storage and/or memory resources, the request may be directed to the cell-based layer; otherwise, the request may be directed to a different layer of the control plane such as the standardized VM management layer 110. A given cell 116 may comprise, for example, one or more resource processing nodes, one or more reconciliation nodes, a local instance of a persistent data store, and metadata indicative of a set of virtualization hosts 155 to be used for VMs managed by the cell in various embodiments. A cell pool manager may be responsible for configuring or establishing the cells 116 of pool 114, collecting metrics or detecting triggering events that indicate that the population of the pool 114 should be changed, changing the number if cells 116 as needed, and/or informing the request routing layer 120 regarding the current configuration of the pool 114 and the mapping functions which may be used to select the particular cell to which a client request should be routed in the depicted embodiment.

The data plane 150 may comprise several types of virtualization hosts 155 in the depicted embodiment, individuals one of which may be used to host one or more VMs requested by VCS clients 180. Some virtualization hosts such as 155A may be employed primarily for standardized virtual machines, and administered with the help of the control plane layer 110. Other virtualization hosts such as 155B may be employed primarily for flexible-capability VMs, and administered with the help of the cell-based layer 112. In some embodiments, a given virtualization host 155 may be used for one or more standardized VMs and/or one or more flexible-capability VMs; that is, virtualization hosts may not necessarily be restricted to hosting a particular type of VM. In at least one embodiment, standardized VMs may not be supported, so that all VMs instantiated at the VCS may be managed using control-plane cells 116.

As shown, virtualization host 155A may comprise one or more software virtualization management components (VMCs) 157 in the depicted embodiment. Such VMCs may, for example, comprise a hypervisor which acts as an intermediary between the virtual machines and the hardware devices of the host, an administrative instance of an operating system running in its own virtual machine, and so on. Using the software VMCs, one or more VMs may be configured at the virtualization host 155A in the depicted embodiment, including VMs 159A, 159B and 159C. VMs 159A and 159B may be respective examples of a particular category of standardized VMs called Type-A VMs in the depicted embodiment, while VM 159C may be an example of a different standardized VM called Type-B. As such, a given virtualization host such as 155A may be used to implement more than one type of standardized VM in at least some embodiments. A request to configure or reconfigure a standardized VM may be submitted by a client 180 to a request router and routed to control plane layer 110 or to a VMC 157 in some embodiments.

At least some virtualization hosts, such as VH 155B, may comprise one or more lightweight VM configuration daemons 165, such as operating system processes implementing APIs to manage micro-VMs in the depicted embodiment. The lightweight VM configuration daemons 165 may perform a subset of the functionality of software VMCs 157 in some embodiments. In such embodiments, much of the virtualization management functionality may be offloaded to hardware, e.g., to one or more offloaded virtualization management components 169 which may be implemented on a card accessible from the processors of the virtualization host via a peripheral bus. As a result of implementing virtualization management operations, such as operations associated with network packet processing, storage I/O, and the like, to the offloaded virtualization manager components 169, more of the resources of a virtualization host 155B may be devoted to client-requested VMs than if software VMCs 157 were employed. In at least some embodiments, the response time for fulfilling certain types of VM configuration requests, such as launchVM requests, may be shorter when lightweight VM configuration daemons are used than if VMCs 157 implemented fully in software are used. With the help of the lightweight daemons 165, one or more flexible-capability VMs 167, such as 167A or 167B, may be instantiated at a given virtualization host 155B. In at least one embodiment, multiple levels of virtualization may be used at some virtualization hosts 155—e.g., a parent virtual machine may first be instantiated at a virtualization host, and a VM configuration daemon which is one of the processes started at that parent virtual machine may be used to start of additional flexible-capability VMs within the parent VM. The parent VM in such a scenario may, for example, be a standardized VM that is set up with the help of layer 110. In some embodiments, one or more flexible-capability VMs 167 may be instantiated at the same host at which one or more standardized VMs are also running.

In the embodiment depicted in FIG. 1, a request router such as 122A may receive a request to set up a VM from a client 180 via an interface 177, and determine which component(s) of the control plane should be selected to fulfill the request. For example, based at least partly on one or more properties of the request, a decision may be made that a cell of the flexible-capability VM management layer should be used, and a particular cell may be identified. In some embodiments, a mapping function provided by a cell pool manager 118 may be used to identify the particular cell to be used, and/or to select a particular request processing node within the cell to which the request should be forwarded. A particular cell may, for example, be selected based on a mapping from a networking-related property of the requested VM (e.g., a subnet within which the VM is to be included, and IP address of the VM, etc.), and/or based on characteristics of the cell itself, such as available resource capacity, current resource utilization levels, affinity considerations (e.g., a given cell may be used for a particular VM if it was previously used for a VM requested by the same requester), and so on. When the request is received at the selected request processing node, a workflow may be initiated to satisfy the request in the depicted embodiment. In some embodiments, the workflow may include storing a record of the request in a persistent data store instance of the selected cell 116, and invoking one or more APIs directed at a lightweight configuration daemon 165 of one of the virtualization hosts 155 associated with the cell. At least some of the virtualization management operations associated with the request may be performed at the virtualization host 155 with the help of an offloaded virtualization manager component 169—e.g., networking and/or I/O configuration for the requested VM may be performed at least in part at or using the offloaded component.

Similar workflows may be performed for other types of VM configuration requests, such as termination or modification requests in various embodiments—records of the requests may be stored in the local instance of the data store at the cell 116, and requests or APIs may be directed to the appropriate virtualization host from the cell if needed. A reconciliation node of the cell may check (e.g., in various anti-entropy iterations) the states of one or more of the VMs being managed by the cell, and initiate rectification operations if the states do not meet targeted criteria or expectations (e.g., if a VM that was expected to be started up did not start, a rectification operation to re-launch the VM may be initiated). The cell pool manager(s) 118 may modify the configuration of the pool 114 as needed—e.g., as the rate of VM configuration requests increases, more cells may be established. In at least one embodiment, a given virtualization host 155 may be managed by more than one cell 116.

After a particular cell has been selected for a given VM instantiation request, in some embodiments, in the absence of a failure, additional control plane operations required during the lifecycle of that VM may be performed within the boundaries of the selected cell. In effect, a cell may be considered an autonomous, highly available, easily replicable unit of control plane functionality, enabling seamless scalability of the VCS functionality with respect to the types of VMs managed using the cells. In embodiments in which small or micro VMs (e.g., VMs whose lifetimes are typically a few seconds or minutes) are handled using the cell pool 114 and virtualization hosts similar to 155B with offloaded virtualization manage components, thousands of VMs may potentially be implemented using a single host. A given cell may be able to process control plane operations for millions of small VMs concurrently in some such embodiments. Parameters such as the number of request processing nodes per cell, the write capacities of the local data store instances, the mappings between hosts and nodes of the cell, etc., may be adjusted over time to achieve desired levels of client request responsiveness, resource utilization, availability and fault tolerance in various embodiments. In at least one embodiment, machine learning models may be utilized at the VCS to proactively tune such parameters in response to changing workload trends.

Example Virtual Machine Categories

Figure 2:
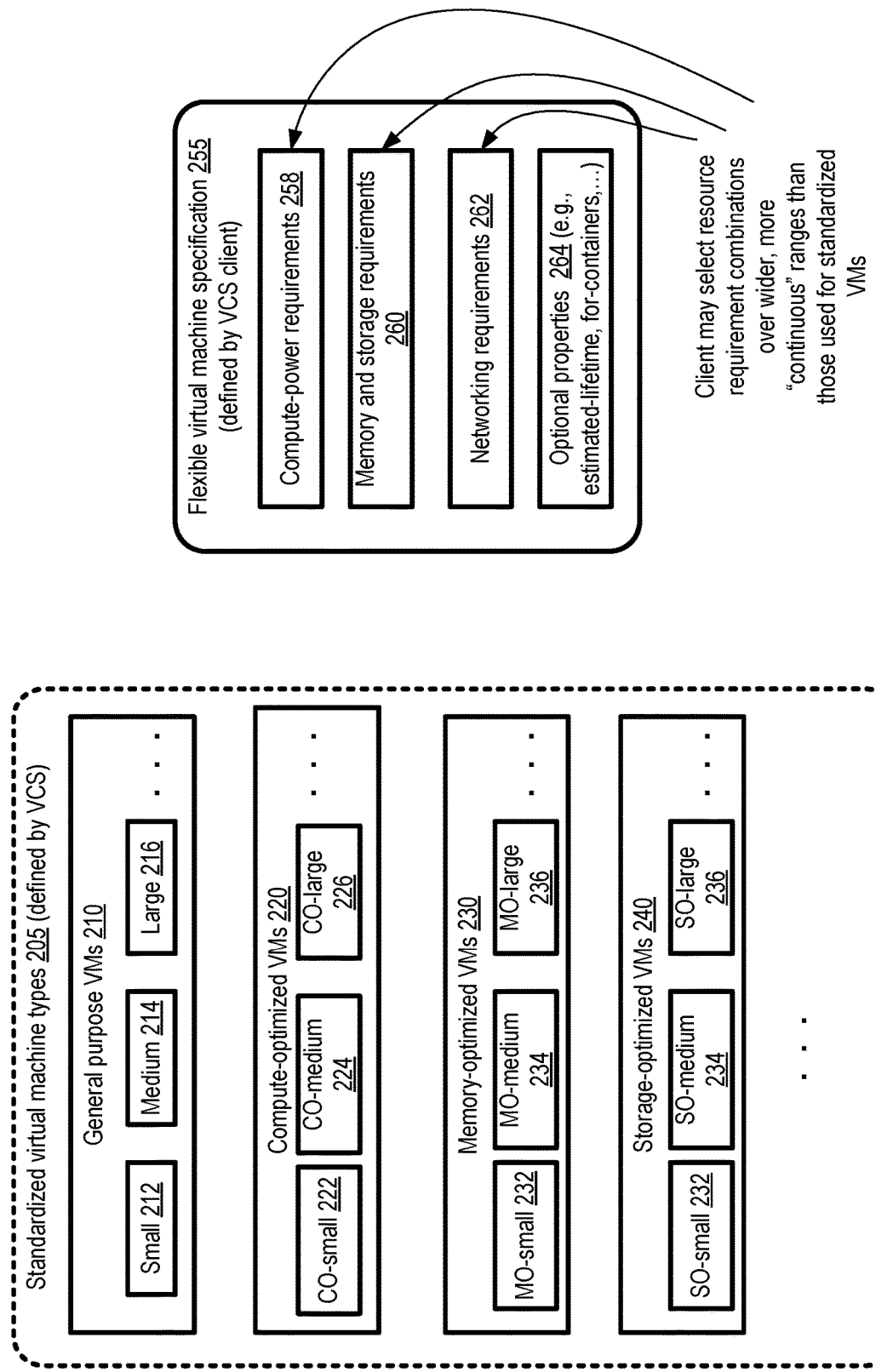
FIG. 2 illustrates an example of a flexible virtual machine specification which may be provided by a client of a virtualized computing service which also supports a set of standardized virtual machine categories, according to at least some embodiments.

FIG. 2 illustrates an example of a flexible virtual machine specification which may be provided by a client of a virtualized computing service which also supports a set of standardized virtual machine categories, according to at least some embodiments. When requesting the instantiation of one or more virtual machines, a VCS client may either select from among the standardized virtual machine types 205 defined by the VCS in the depicted embodiment, or provide one or more flexible VM specifications 255 to the VCS.

The standardized set of virtual machine types may be subdivided into families, such as a general-purpose VMs family 210, a compute-optimized VMs family 220, a memory-optimized VMs category 230, a storage-optimized VMs family 240, and so on in some embodiments. Depending on the estimated needs of the application for which a given VM is to be used by the client, a VM type from the appropriate family may be selected. The relative resource capabilities for the different VM types may be expressed using units selected or defined by the VCS—e.g., for computing, units such as virtual CPUs that are roughly performance-equivalent to a particular well known processor running at a particular clock speed may be defined. The family may be selected based on qualitative considerations (e.g., is the application mix more memory-intensive or more compute-intensive?), while the particular VM type within the family (e.g., small 212 vs. medium 214 vs. large 216 in the general purpose family) may be selected based on considerations such as desired performance levels, cost, and so on. Compute-optimized VMs 220, such as CO-small VMs 222, CO-medium VMs 224, or CO-large VMs 226 may, for example, be implemented using hosts with more and/or faster processors or cores than the general purpose VMs in the depicted embodiment. In the memory-optimized VMs 230 such as MO-small VMs 232, MO-medium VMs 234, or MO-large VMs 236, the amount of memory (e.g., the number of gigabytes of memory per virtual CPU) relative to the computing capability may be higher than in compute-optimized VMs 220 or the general-purpose VMs. Similarly, in the storage optimized family 240 comprising SO-small VMs 232, SO-medium VMs 234, and SO-large VMs 236, the ratio of local storage to compute power (e.g., number of gigabytes of local solid-state device (SSD) storage per virtual CPU) may be higher than in the other families.

Even though a wide range of resource capacities may be covered by the different pre-defined or standardized VM types, some clients may require VMs whose combination of resource capabilities does not match well to any of the standardized types. Accordingly, in some embodiments, such clients may provide their own specifications 255, indicating (in units interpretable by the VCS) their particular combinations of compute-power requirements 258, memory and storage requirements 260, networking requirements 262, and/or a set of optional properties 264. Optional properties 264 may, for example, indicate an estimated lifetime (e.g., N minutes) of a requested VM, an intended type of use of the VM (e.g., for setting up software containers) and the like in the depicted embodiment. In various embodiments, clients may use specifications 255 to select resource requirement combinations over wider, more "continuous" ranges than those chosen for standardized VMs. For example, among the memory and storage combinations offered in the standardized VMs, combinations such as (64 GB memory, 1 TB local SSD storage) and (128 GB memory, 2 TB local SSD storage) may be offered, but a client may specify a VM with the combination requirement (96 GB memory, 1.5 TB storage) or the like. From the perspective of the VCS provider, enabling clients to specify VM requirements using such continuous ranges over different performance dimensions may have the additional benefit in various embodiments that it may become possible to increase hardware oversubscription levels (and/or overall hardware resource utilization levels) without affecting responsiveness. Given the same set of virtualization hosts, it may, depending on the mix of concurrent or near-concurrent VM requests, be possible to "fit" more virtual machines in total on the set of hosts than would have been possible if only discrete standardized VMs were supported. For example, in a scenario where some flexible VM requests need much more storage relative to computing power, while other near-concurrent flexible VM requests need much less storage relative to computing power, a cell-based control plane of the VCS may allocate resources from the same host for both groups of flexible VMs in some embodiments, with no negative impact on the perceived performance of either group.

Example Components of a Control Plane Cell

Figure 3:
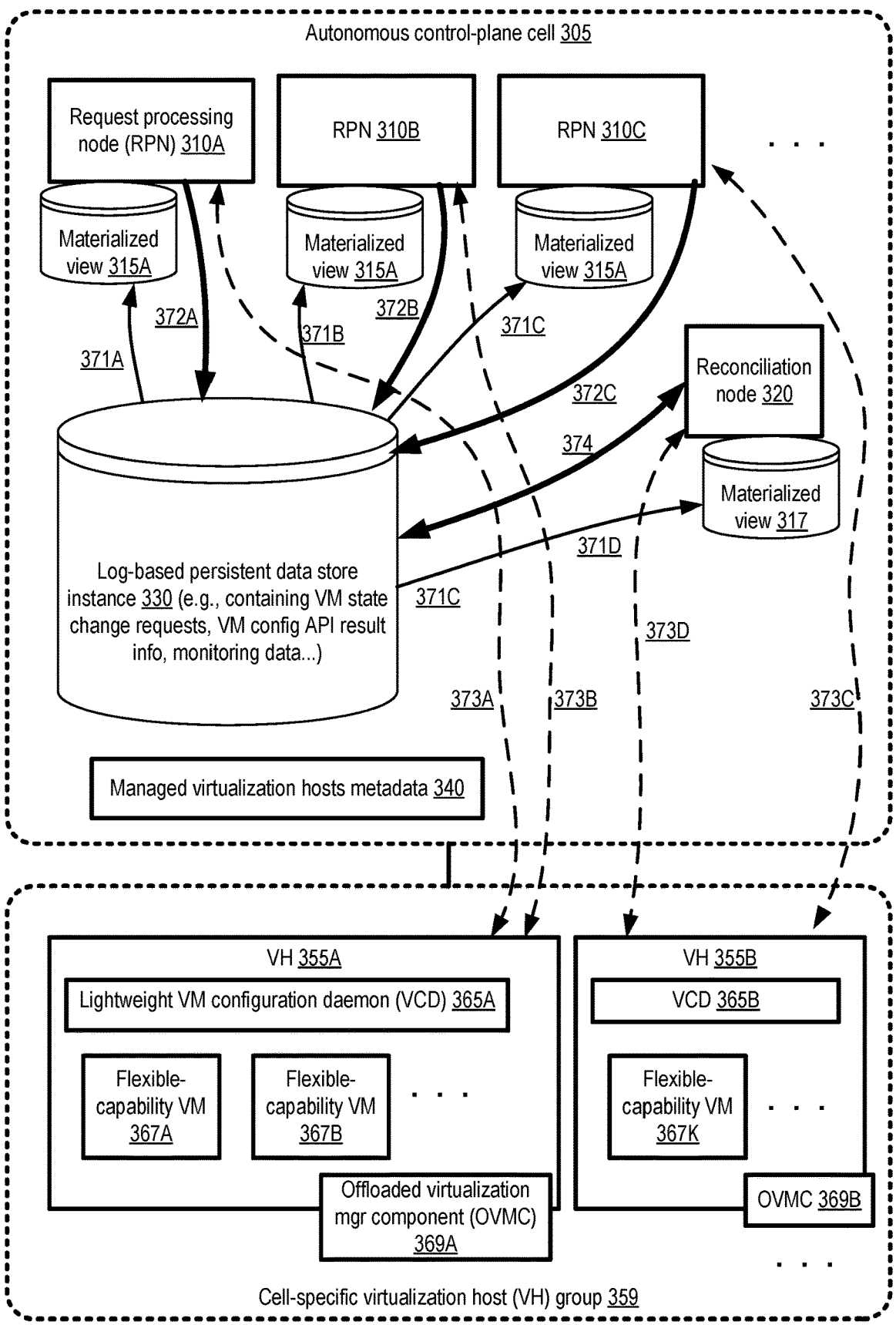
FIG. 3 provides a high-level overview of an example architecture of a control plane cell of a virtualized computing service, according to at least some embodiments.

FIG. 3 provides a high-level overview of an example architecture of a control plane cell of a virtualized computing service, according to at least some embodiments. As shown, an autonomous control plane cell 305 may comprise some number of request processing nodes (RPNs) 310 (e.g., 310A, 310B and 310C), one or more reconciliation nodes 320, an instance 330 of a log-based persistent data store, and metadata 340 indicating a group of one or more virtualization hosts to be managed by the cell in the depicted embodiment. In some embodiments the virtualization hosts may be considered part of the cell. Details regarding the functioning and components of a log-based persistent data store that may be employed in various embodiments are provided below in the context of FIG. 6 and FIG. 7. In at least some embodiments, an optimistic concurrency control algorithm may be implemented for write transaction submitted to the data store instance 330, as also discussed below. The instance 330 may serve as a repository storing a sequence of immutable records related to VM state changes, arranged in the order in which the corresponding state change events were processed in the depicted embodiment. The instance 330 may, for example, include records indicating requests for VM state changes received at the RPNs (such as requests to launch, terminate or modify VMs), API requests submitted to virtualization hosts to implement requested configuration changes, results of such API requests, monitoring data, and/or records of rectification operations which may be initiated by the reconciliation node 320 in some embodiments. At least a portion of the contents of the instance 330 may be materialized in some embodiments at individual ones of the RPNs and/or the reconciliation node in some embodiments. For example, a respective materialized view 315 (e.g., 315A, 315B and 315C) comprising at least a relevant subset of the contents of the instance 330 may be generated and updated as needed for each of the RPNs 310 (as indicated by arrows 371A, 371B and 371C), and a materialized view 317 may be generated and updated as needed for the reconciliation node 320 (as indicated by arrow 374) in the depicted embodiment.

When a client of the VCS submits a VM instantiation request, a request router of the VCS may direct the request (or an internal representation of the request) to a selected RPN 310 at a selected cell 305 in various embodiments. As mentioned earlier, any of various properties of the request (e.g. the identity of the requester, a networking property such as a subnet, etc.) and/or the individual cells that have been established at the VCS control plane (e.g., resource utilization information pertaining to the cells or the hosts managed by the cells) may be used to decide which cell should be responsible for the requested VM. In some embodiments in which the selected cell contains multiple RPNs, a particular RPN may be selected using a random selection policy. In other embodiments, a mapping function between one or more VM request properties and an RPN ID may be used to select the RPN. In some embodiments, after a particular RPN is selected to respond to the instantiation of a VM, that same RPN may be used for processing any additional state changes requests for that VM. In contrast, in other embodiments, any of the RPNs may be selected to process one or more of the state change requests pertaining to a given VM.

After receiving an indication of a request to instantiate a VM, an RPN 310 may initiate at least a portion of a workflow to launch a VM with the properties indicated in the request in the depicted embodiment. The workflow may comprise a synchronous set of operations and an asynchronous set of operations in some embodiments, with the synchronous operations being performed by the RPN 310, and the asynchronous operations being performed by the reconciliation node. In one embodiment, the RPN may store a record of the request at the data store instance 330 (as indicated by arrows 372A, 372B and 372C), and then invoke an API to launch the instance at a selected virtualization host 355 (e.g., 355A or 355B) of the group 359 of virtualization hosts being managed by the cell. The invocation of an API by an RPN 310, and the corresponding response, is indicated by arrows labeled 373 (373A, 373B and 373C) in FIG. 3. In embodiments in which the virtualization host comprises an offloaded virtualization manager component 369 (e.g., OVMCs 369A or 369B), the portion of the workflow initiated by the RPN may involve the use of the OVMC—e.g., at least a portion of the network and storage I/O configuration of the requested VM may be performed with the help of the OVMC. In some embodiments, a response to the API call may also be recorded in the instance 330 of the persistent data store by the RPN. For example, in response to the API invocation, a lightweight VM configuration daemon 365 (e.g., 365A or 365B) at a virtualization host 355 (e.g., 355A or 355B) may start up a flexible-capacity VM 367 (e.g., 367A, 367B or 367C) and provide a VM identifier or other metadata pertaining to that VM to the RPN in some embodiments. A similar approach may be taken by an RPN to other types of VM configuration change requests in various embodiments. For example, when a request to modify or terminate a VM is received, a record of the request may be stored in the instance 330 and an API may be invoked to perform the modification or termination. In some embodiments, the API may for a VM state change may be invoked before, or in parallel with, the insertion of the record of the request in the data store instance 330.

In some cases, a request (such as an API call initiated by the RPN) directed to the virtualization host 355 for a VM state change may not succeed, or may take a longer time than expected. In order to deal with such scenarios, in some embodiments the reconciliation node 320 may perform one or more anti-entropy iterations, e.g., as part of the asynchronous portion of the workflow associated with VM state change requests. In a given anti-entropy iteration, the actual states of one or more VMs may be compared to their respective expected states, and one or more rectification operations to attempt to change the states of the VMs to their expected state may be initiated. In one embodiment, the reconciliation node 320 may examine at least a portion of the log-based persistent data store instance 330 to determine the expected states and/or the actual states, as indicated by arrow 374. In at least one embodiment, the reconciliation node 320 may communicate with one or more of the virtualization hosts 355 (e.g., with a monitoring agent or daemon running on the virtualization host, or with a VM itself) to determine the actual state of a VM, as indicated by arrow 373D. If a discrepancy between an expected state and an actual state of a VM is identified, the reconciliation node 320 may take any of several types of rectification actions in the depicted embodiment: e.g., a request may be sent to a virtualization host 355 via an API invocation, or a request may be sent to an RPN to re-try an operation that has not succeeded. In at least some embodiments, a record of the rectification action may be added to the instance 330 of the data store by the reconciliation node 320. A number of different types of triggers may lead to the initiation of an anti-entropy iteration of the reconciliation node in various embodiments—e.g., a new iteration may be initiated when a particular amount of time has elapsed since the previous iteration, when a certain number of state change requests have been processed by the RPNs since the previous iteration, when an apparent failure is detected at some component of the cell 305, or if a request for an anti-entropy iteration is received (e.g., from another component of the cell 305, from a virtualization host 355, or from some other component of the VCS control plane).

Various parameters governing the structure and internal organization of a cell 305 may be tuned or adjusted over time in some embodiments, e.g., by a cell pool manager. Such parameters may, for example, include the number of RPNs 310 to be set up in a cell, the number of reconciliation nodes 320 to be set up, the write rate capacity of the persistent data store instance 330, the number and types of virtualization hosts 355 managed by the cell, how many distinct hosts are to be used for RPNs and reconciliation nodes at the cell (e.g., whether there is a 1:1 relationship between RPNs and hosts, in which case each RPN would be set up on a respective host, or an N:1 relationship) and so on. The parameters may be adjusted to achieve desired levels of performance, availability and fault tolerance in various embodiments. In at least some embodiments, the RPNs and/or the reconciliation node may be implemented at respective virtual machines (e.g., as instances of standardized virtual machine types supported at the VCS).

Cell Isolation Characteristics

Figure 4:
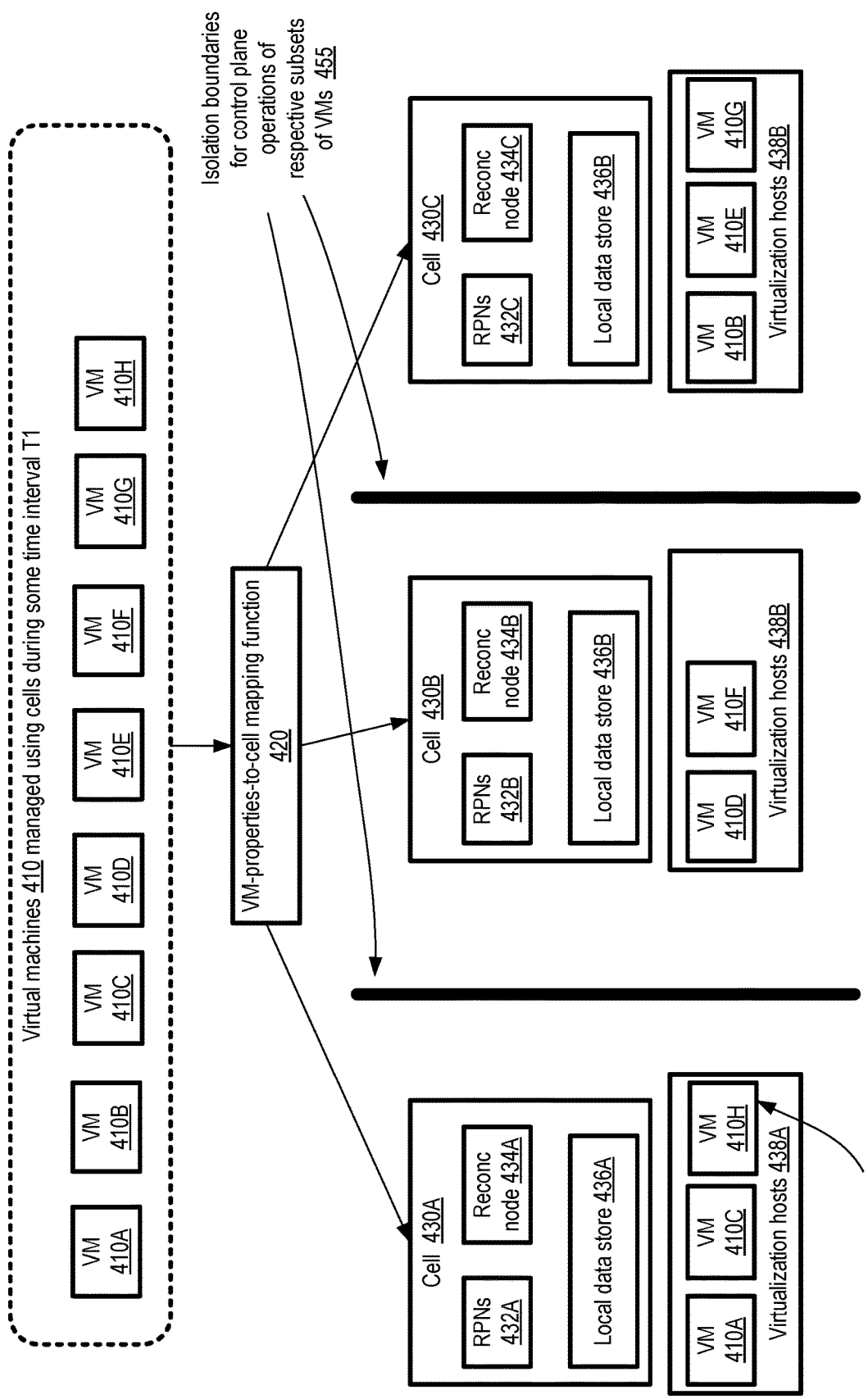
FIG. 4 illustrates example isolation characteristics of a cell-based architecture of a control plane of a virtualized computing service, according to at least some embodiments.

FIG. 4 illustrates example isolation characteristics of a cell-based architecture of a control plane of a virtualized computing service, according to at least some embodiments. In the depicted embodiment, a total of eight virtual machines 410 (410A-410H) that are administered using control plane cells of the kind described above are shown by way of example. A mapping function 420 may be used to determine which particular cell of the VCS control plane cell pool is to be used for a given VM in the depicted embodiment. The function 420 may for example take one or more attributes or properties of a requested VM 410 as input, and provide an indication of the individual cell 430 (e.g., 430A, 430B or 430C) is to be designated as responsible for the administration of the VM.

In the depicted embodiment, individual cells 430 may comprise a respective set of one or more request processing nodes (RPNs) 432 (e.g., 432A, 432B or 432C), one or more reconciliation nodes 434 (e.g., 434A, 434B or 434C), an instance of a local data store 436 (e.g., 436A, 436B or 436C), and metadata identifying a set of virtualization hosts 438 (e.g., 438A, 438B or 438C) to be managed using the cell. In accordance with the mapping function 420, a respective subset of the VMs 410 may be assigned to individual ones of the cells 430. For example, VMs 410A, 410C and 410K may be assigned to cell 430A, VMs 410D and 410F to cell 430B, and the remaining VMs 410B, 410E and 410G to cell 430C in the scenario depicted in FIG. 3.

Individual cells 430 may be logically (and in at least some implementations physically) isolated or separated from one another in various embodiments, as indicated by isolation boundaries 455. Accordingly, in such embodiments, after a given VM (such as 410H) is assigned to a particular cell (such as 430A), during normal operation 475, no communication between cells may be needed. All control plane operations for the VM may be handled by the same cell 430 to which that VM was assigned in at least some embodiments. A failure of any given cell may leave other cells (and therefore VMs managed by the other cells) unaffected in various embodiments. Note that at least in some embodiments, in the extremely unlikely event of a failure of the RPNs, the reconciliation node(s) and/or the local data store of a cell, the VMs that have already been instantiated by that cell may still remain operational. A different cell may be assigned to manage subsequent state changes of such "orphaned" operational VMs in some embodiments.

In many complex computational environments, the introduction of software changes or upgrades sometimes results in problematic scenarios (e.g., if a bug is introduced as a result of the "upgrade"). One of the advantages of the autonomous cell-based approach outlined herein is that software updates may be rolled out one cell at a time in various embodiments, so that the impact of any bugs which may thereby have been introduced is restricted to a single cell and its managed VMs at a time. In contrast, if the control plane comprised one or more monolithic components used by all the VMs, a bug introduced into the monolithic component could impact the entire VCS.

In at least some embodiments, as mentioned earlier, multiple layers of virtualization may be implemented at a VCS which includes at least one cell-based control plane layer. Consider an example scenario in which a VCS control plane includes a standardized VM management layer SL and a cell-based layer CBL. The cell-based layer CBL may logically subdivide the resources allocated for a standardized virtual machine (set up with the help of SL) running at a virtualization host 438 into some number of smaller flexible virtual machines, thus implementing two layers of virtualization. Components of individual cells of CBL may themselves be implemented using standardized virtual machines in some embodiments—e.g., an RPN 432 may be implemented at a standardized VM, a reconciliation node 434 may be implemented at another standardized VM, and so on. In various embodiments, after a CBL cell and its virtualization hosts have been initialized, very little interaction may be required between the SL and the CBL. Individual cells of the CBL may thus be largely autonomous/independent not only with respect to other cells, but also with respect to the standardized VM layer of the control plane as well. In some embodiments, changes in the configuration of the SL may in some cases be much harder to achieve than changes to the CBL; for example, some components of the SL may be monolithic or hard to expand, while new cells may be added and/or removed fairly easily. As a consequence of the ease with which changes can be made at the CBL, the overall scalability of the VCS may be substantially enhanced in various embodiments, since new cells may be dynamically configured as needed without requiring changes at the SL, and individual cells may be capable of handling large numbers of VMs independently without interacting much with the SL. In at least some embodiments, to further enhance VCS control plane scalability and flexibility, multiple cell based layers may be established in a hierarchy. For example, a first cell based layer CBL1 may configure medium-sized virtual machines by subdividing resources of a relatively large standardized VM, a second cell based layer CBL2 built on top of CBL1 may subdivide resources of the medium-sized VMs to configure even smaller VMs, and so on.

Example Virtualization Host Components

Figure 5:
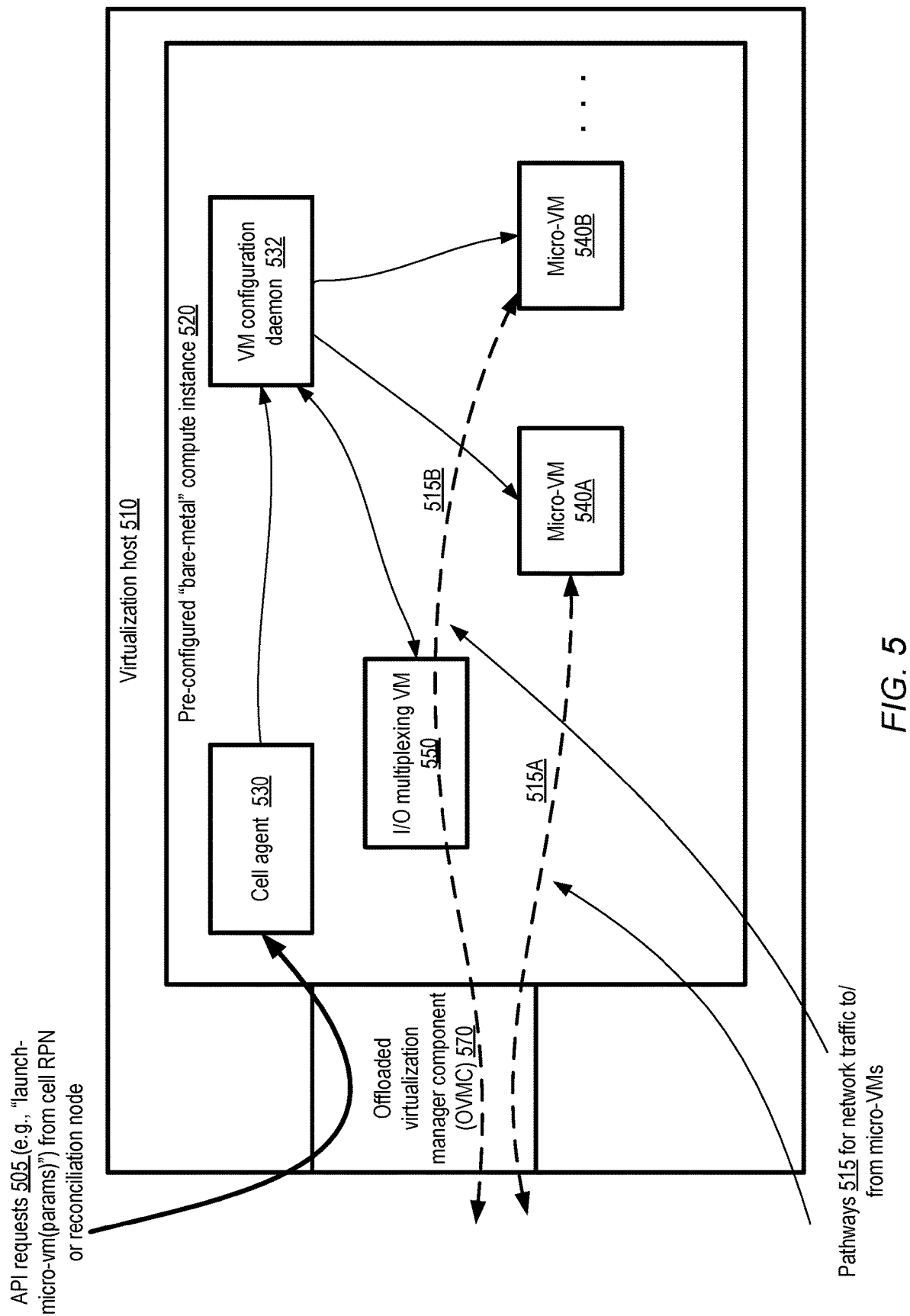
FIG. 5 illustrates example components of a virtualization host which may be managed with the help of a control plane cell, according to at least some embodiments.

FIG. 5 illustrates example components of a virtualization host which may be managed with the help of a control plane cell, according to at least some embodiments. In the depicted embodiment, a virtualization host 510 may comprise an offloaded virtualization manager component (OVMC) 570. The OVMC 570 may be implemented at least in part in hardware, e.g., on circuitry that is accessible from the processors of the virtualization host via a peripheral interconnect. In addition, the virtualization host 510 may comprise a pre-configured bare-metal compute instance 520 in the depicted embodiment. The bare-metal compute instance may represent one of the standardized offerings of the VCS in some embodiments (similar to the standardized virtual machine types discussed in the context of FIG. 2), and may be established by the control plane, e.g., as part of the configuration of the control plane cell. In one embodiment, a bare-metal compute instance 520 may comprise various stripped-down components of an operation system (e.g., a variant of Linux), including one or components that support the configuration of child virtual machines within the bare-metal compute instance itself.

In the embodiment depicted in FIG. 5, API requests 505 for VM configuration, such as a launch-micro-VM(params) API, where params indicates desired properties of the VM to be launched, may be directed to a local cell agent 530 (e.g., a process or thread instantiated within the bare-metal compute instance 520) by an RPN or reconciliation node of the cell designated to administer the host 510. Such requests may be routed via the OVMC 570 in some embodiments. A local cell agent 530 which implements the API may be considered another component of the control plane of the VCS in some embodiments. The cell agent 530 may in turn transmit a message to a VM configuration daemon 532 (another process running within the bare-metal compute instance 520) to perform the requested VM configuration operations in some embodiments. The daemon 532 may configure or launch one or more micro-VMs such as 540A and 540B within the bare-metal compute instance 520 in the depicted embodiment. As such, multiple levels of virtualization may be implemented in some embodiments: first, a bare-metal compute instance may be set up by the VCS control plane, and then smaller VMs may be launched within (e.g., using the resources accessible from) the parent bare-metal compute instance on behalf of customers of the VCS. In at least some embodiments, the VM configuration daemon may comprise a modified version of a KVM (kernel-based virtual machine) daemon that is optimized for fast launch of virtual machines. Some of the optimizations may, for example, include removal of emulation support for legacy devices from a QEMU (quick emulator) component of the KVM, as well as other streamlining of the code in such embodiments. As a result of such optimizations, the time taken for launching new virtual machines, especially virtual machines that do not include at least some types of legacy virtual devices, may be significantly reduced.

In some embodiments, one or more additional VMs, such as I/O multiplexing VM 550 may be set up at the bare-metal compute instance. As indicated by arrow 515B, network traffic pathways 515 configured for some micro-VMs (such as 540B) may comprise the multiplexing VM 550 in some embodiments; for example, port address translation (or other types of address translations) may be performed at the multiplexing VM. For some micro-VMs (such as 540A), respective virtual network interfaces may be set up at the VCS, e.g., with the help of the OVMC 570, and the I/O multiplexing VM 550 may not be part of the corresponding network traffic pathway (such as pathway 515A).

It is noted that in some embodiments, control plane cell-based administration may not necessarily be restricted to virtualization hosts at which bare-metal compute instances 520 are run, to hosts at which OVMCs 570 are configured, or to hosts at which micro-VMs 540 are instantiated. In at least one embodiment, for example, standardized VMs of the kind discussed in the context of FIG. 2 may be managed using a cell-based VCS control plane. In some embodiments, separate control plane agents and/or daemons of the kind shown in FIG. 5 may not be employed; instead, for example, a single API handler process may be used.

Example Persistent Data Store

Figure 6:
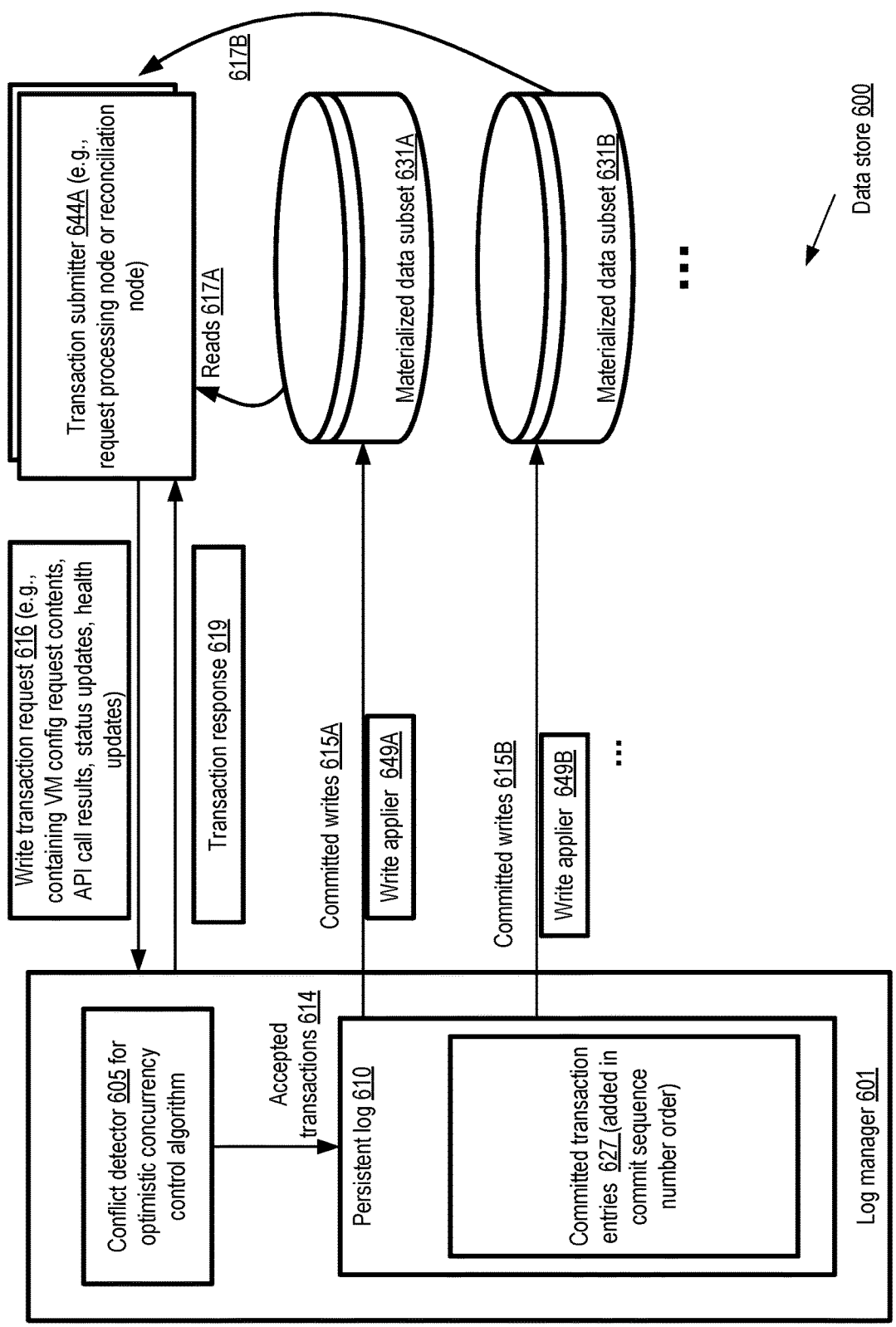
FIG. 6 illustrates a high-level overview of a persistent log-based data store which may be employed to store records pertaining to virtual machines state changes at a control plane cell, according to at least some embodiments.

FIG. 6 illustrates a high-level overview of a persistent log-based data store which may be employed to store records pertaining to virtual machines state changes at a control plane cell, according to at least some embodiments. As mentioned above, in various embodiments a respective independent instance of such a data store may be set up for each cell. As shown, data store 600 may include a log manager 601 of a persistent log 610 that may be used to store records associated with one or more applications, such as records associated with virtual machine state changes managed by a control plane cell of a virtualized computing service. The log manager 601 may be implemented using one or more computing devices in various embodiments. The persistent log may comprise an append-only sequence of entries, with in-place modification of entries not permitted in at least some embodiments. The log may comprise committed transaction entries 627 stored in the order in which the corresponding transactions proposed by transaction submitters 644 (e.g., 644A) were approved in some embodiments. RPNs and reconciliation nodes of control plane cells may represent examples of transaction submitters in various embodiments. In at least some embodiments, a given transaction that has been approved may be assigned a unique commit sequence number, and the entries in log 610 may comprise entries stored in increasing order of commit sequence numbers. The data store may include one or more materialization nodes in the depicted embodiment, at individual ones of which at least a respective subset of the log contents are materialized, such as materialized data subset 631A or 631B. In some embodiments, different types of storage systems or databases may be used for the different materialized subsets 631—e.g., subset 631A may be stored at an in-memory database, subset 631B at a relational database, and so on. In various embodiments, a given materialization data subset 631 may be part of a larger database from which data may be read as part of a transaction. In some embodiments, individual ones of the RPNs and the reconciliation node of a control plane cell may, for example, employ a respective in-memory database system for a subset of the log contents that is relevant for that RPN or reconciliation node (e.g., materialized views 315 and 317 of FIG. 3). Individual ones of the transaction submitters 644 may be registered or configured for transaction management by the log manager 601 in the depicted embodiment. In effect, the log manager 601 may be responsible for implementing a replicated state machine, with the committed transaction entries expressing state changes in the depicted embodiment. The log manager 601 may itself be implemented as part of a network-accessible state management service of a provider network or cloud computing environment in some embodiments.

In the depicted embodiment, transaction submitters 644 may construct write transaction requests 616 locally (e.g., at hosts used for running processes implementing the transaction submitters), and then submit (or "offer") the transaction requests for approval and commit by the log manager 601. In one implementation, for example, a client-side library may enable a transaction submitter 646 to initiate a proposed transaction by issuing the logical equivalent of a "transaction-start" request. Within a candidate transaction, the submitter may perform some number of reads on a selected set of objects of a materialized data subset, and locally (e.g., in local memory) perform a proposed set of writes in some embodiments. The proposed transaction may then be submitted by issuing the equivalent of a "transaction-end" request. A given transaction request 616 may include a number of elements in various embodiments, including for example an indication of a read set and write set of the transaction, a write payload, and so on.

The decision as to whether to commit a requested transaction may be made based on various factors. In the depicted embodiment, a transaction request 616 may first be processed by a conflict detector 605 of the log manager 601 which implements an optimistic concurrency control algorithm. The conflict detector 605 may determine whether the reads of the transaction conflict with writes of previously-committed transactions represented in committed transaction entries 627, and/or whether any logical constraints of the proposed transaction are violated. As mentioned above, in at least some embodiments, a given transaction request 616 may include a read set descriptor indicating one or more reads 617 (e.g., reads 617A or 617B) respectively from one or more materialized data subsets, and a write set descriptor indicating proposed writes which may eventually be propagated to one or more materialized data subsets, where the set of data subsets that are read in the transaction may or may not overlap with the set of data subsets affected by the writes. The reads may be performed using the native programmatic read interfaces of the storage systems used for the subsets 631 in some embodiments. The transaction requests 616 may be formatted in accordance with a storage-system-independent transaction language in various embodiments, e.g., a language defined in a schema associated with log manager 601.

At least some of the writes indicated in a given transaction request may be dependent on the results of one or more of the reads in some embodiments. For example, a requested transaction may involve reading one value V1 from a location L1, a second value V2 from a second location L2, computing a function F(V1, V2) and storing the result of the function at a location L3. In some locking-based concurrency control mechanisms, exclusive locks may have to be obtained on L1 and L2 to ensure that the values V1 and V2 do not change before L3 is updated. In contrast, an optimistic concurrency control mechanism may be used by the log manager 601 of FIG. 6 in the depicted embodiment, in which no locks may have to be obtained. Instead, in the depicted embodiment, the conflict detector 605 may determine, based at least in part on the contents of the transaction request and on a set of committed transaction entries of the log 610, whether one or more of the data items read in the requested transaction may have been updated since they were read from their respective storage systems. A sequence number based technique may be used to determine whether such read-write conflicts exist in at least some embodiments.

If the conflict detector 605 determines that none of results of the proposed transaction's reads have been affected by subsequently committed writes, additional checks for logical constraint violations may be performed in at least some embodiments. For example, if the transaction request includes a "required transaction signature", the conflict detector 605 (or some other component of the log manager configured to perform logical constraint checking) may check whether a transaction with that signature has been committed. If the required transaction has not been committed, the request 616 may be rejected. Similarly, in some embodiments a transaction may include a "forbidden transaction signature", and the log manager may check (e.g., by examining some set of committed transaction entries 627) whether a transaction with that signature has already been committed or not. If the forbidden transaction has been committed, the requested transaction may also be rejected.

If no read-write conflicts are detected, and if no logical constraints would be violated if the transaction request 616 were accepted for commit, the transaction request may be accepted for commit in the depicted embodiment. A committed transaction entry 627 representing such an accepted-for-commit transaction may be appended to the log 610. This type of approach to concurrency control may be deemed optimistic in that decisions as to whether to proceed with a set of writes of a transaction may be made initially under the optimistic assumption that read-write conflicts are unlikely, and that logical constraint violations are unlikely. As a result, in scenarios in which these assumptions are typically valid, higher throughputs and lower response times may be achieved than may be possible if more traditional locking-based techniques are used. In the case where a transaction is accepted for commit, in some embodiments contents of a corresponding entry 627 may be replicated at some number of nodes of a replication graph (as described below in further detail with respect to FIG. 7) in the depicted embodiment before the commit is considered successful. In some embodiments, the requesting transaction submitter component 644 may be notified when the requested transaction is committed, e.g., in the form of a transaction response 617. In at least one embodiment, the submitter 644 may be informed when a transaction is rejected, so that, for example, a new transaction request may be generated and submitted for the desired updates.

For each transaction that is committed, in at least some embodiments a commit sequence number (or some other identifier indicative of the commit) may be generated and stored as part of the corresponding entry 627. Such a commit sequence number may, for example, be implemented as a counter or as a logical timestamp. The commit sequence number may be determined by the conflict detector in some embodiments, or at a different component associated with the log (such as the committer node of a replication graph being used) in other embodiments.

In the depicted embodiment, after a given transaction is committed and its entry is stored at the log, at least some of the writes of the transaction may be applied or propagated to one or more of the storage systems where materialized data subsets 631 are stored. Different subsets of the committed writes may be of interest to, or relevant to, different transaction submitters in some embodiments. For example, in one embodiment, committed transaction entries only for those VMs for which a particular RPN was selected to initiate the instantiation workflow may be considered relevant to that particular RPN. In some implementations, the writes may be applied in an asynchronous fashion. In such implementations, there may be some delay between the time at which the transaction is committed and the time at which the payload of a particular write operation of the committed transaction reaches the corresponding materialized data subset 631. In some embodiments, respective asynchronous write appliers 649 (e.g., write appliers 649A and 649B) may be used to propagate some or all of the writes to relevant materialization nodes. In one embodiment, the write appliers may be components of the log manager 601, while in other embodiments the write appliers may be independent processes, and may represent respective cursors on the log. After the data written during a transaction is applied to the corresponding materialized data subsets, client-side components such as transaction submitters 644 may be able to read the updated data using the respective read interfaces of the storage systems used for the data subsets. In some embodiments, at least one of the write appliers may implement synchronous writes.

In at least one embodiment, the log manager 601 may implement respective sets of read and write programmatic interfaces (e.g., application programming interfaces or APIs). The write interfaces may be used by authorized entities (such as transaction submitters 644) to submit transaction requests, while the read interfaces may be used by various authorized entities (e.g., including write appliers 649 and/or the transaction submitters) to read contents of entries 627.

In at least one embodiment, the log manager 601 may provide an indication of the latest committed state of the log (such as the highest commit sequence number generated thus far), e.g., in response to a query from a transaction submitter. The write appliers 649 may indicate the commit sequence numbers corresponding to the writes that they apply in various embodiments. Thus, at any given point in time, a transaction submitter may be able to determine the commit sequence number corresponding to the most-recently-applied write at a given materialization data store 631. In at least some embodiments, during the generation of a transaction request 616, the most-recently-applied commit timestamps may be obtained from the storage systems that are accessed during the transaction, and one or more of such commit sequence numbers may be indicated in the transaction request as a conflict check delimiter. For example, consider a scenario in which, at the time that a particular submitter 644 initiates a transaction that includes a read of a location L1 at a database DB1, the commit sequence number corresponding to the most recently applied write at DB1 is SN1. Assume further that in this example, the read set of the transaction only comprises data of DB1. In such a scenario, SN1 may be included in the transaction request 616. The conflict detector 605 may identify log entries with sequence numbers greater than SN1 as the set of entries to be examined for read-write conflicts for the requested transaction. If any of the write sets of the identified commit records overlaps with the read set of the requested transaction, the transaction may be rejected/aborted; otherwise, the transaction may be considered free of read-write conflicts in this example scenario. Similar sequence number-based delimiters may be used for logical constraint checking in some embodiments.

Replicated Graphs for Data Store Instances

Figure 7:
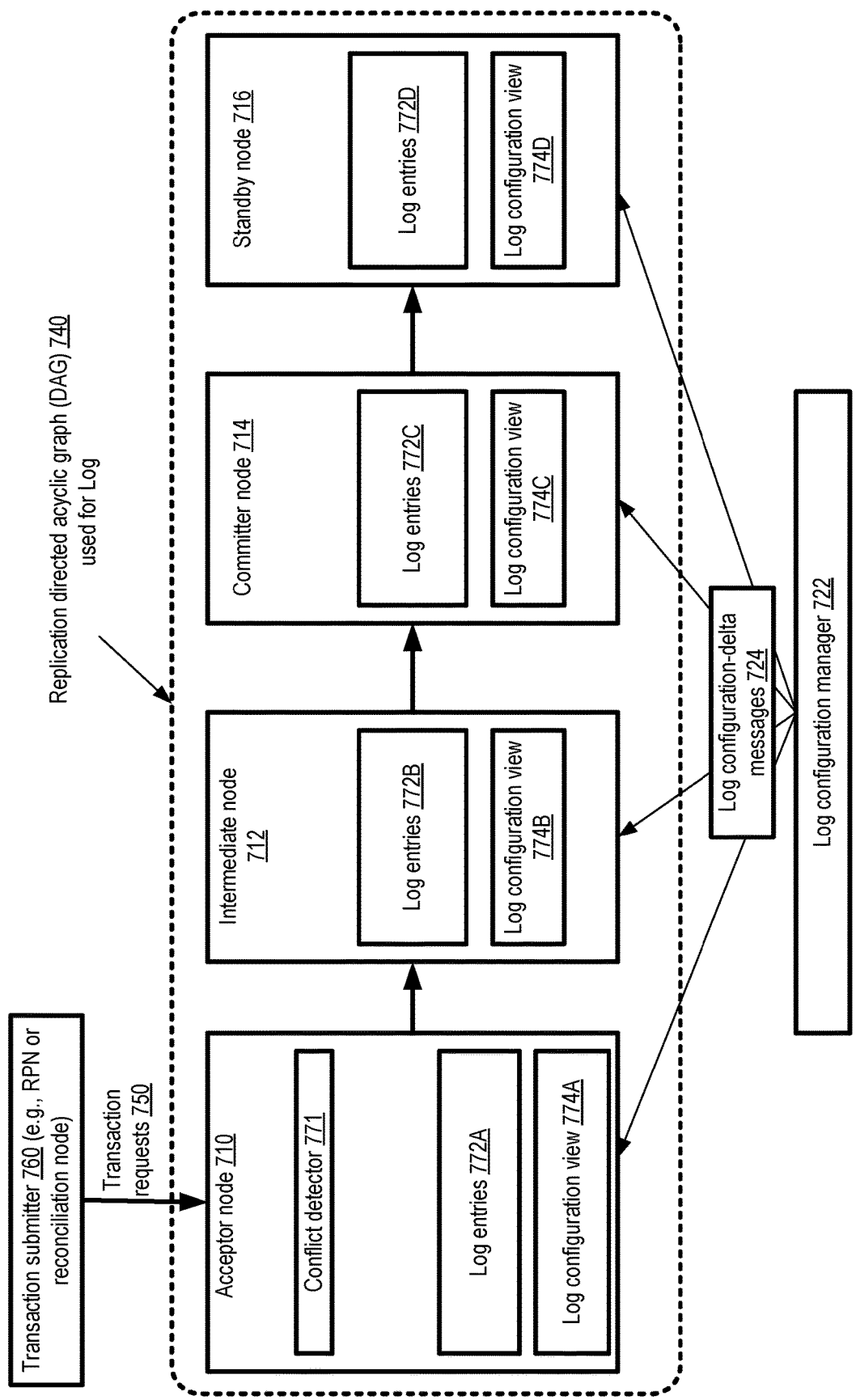
FIG. 7 illustrates an example directed acyclic graph configuration of a persistent log-based data store, according to at least some embodiments.

In some embodiments, at least some contents of the data store instance used for VM state change management within a control plane cell may be replicated for enhanced data durability and/or higher levels of availability. FIG. 7 illustrates an example directed acyclic graph configuration of a persistent log-based data store, according to at least some embodiments. In various embodiments, a replication DAG 740 may include one or more acceptor nodes 710 to which transaction requests 750 may be transmitted by submitters 760, one or more committer nodes 714, zero or more intermediary nodes 712 each positioned along a replication pathway comprising DAG edges leading from an acceptor node to a committer node, and zero or more standby nodes 716 that are configured to quickly take over responsibilities of one of the other types of nodes in the event of a node failure. In various embodiments, the functionality of the log manager described above in the context of FIG. 6 may be distributed among subcomponents at one or more of the replication DAG nodes. In the embodiment depicted in FIG. 7, the acceptor node includes the conflict detector 771 of the log manager. In other embodiments, instead of being incorporated within an acceptor node, the conflict detector may be implemented separately.

In at least some embodiments, each node of a particular replication DAG such as 740 may be responsible for replicating log entries. The log entries may be propagated along a set of edges from an acceptor node to a committer node of the DAG along a replication pathway. In FIG. 7, the current replication pathway starts at acceptor node 710 and ends at committer node 714 via intermediary node 712. For a given log entry (e.g., an entry indicating a committed write), one replica may be stored at each of the nodes along the replication path, e.g., in log entries 772A, 772B and 772C. Each log entry propagated within the DAG may include a respective sequence number or a logical timestamp that is indicative of an order in which the corresponding transaction request was processed (e.g., at the acceptor node 710) in some embodiments. When a particular log entry reaches a committer node, e.g., after a sufficient number of replicas of the entry have been saved along the replication pathway, the corresponding transaction may be explicitly or implicitly committed. If for some reason a sufficient number of replicas cannot be created, the log entries may be logically and/or physically removed (e.g., by setting a "removed" flag) in some embodiments from the nodes (if any) at which they have been replicated thus far in the depicted embodiment. After a commit, the writes of a transaction may be propagated or applied to a set of destinations (such as storage devices at which the contents of the materialized data subsets are located) as described earlier, e.g. by respective write appliers. In some implementations, only a subset of the DAG nodes may be read in order to propagate committed writes to their destinations. In other embodiments, log entries may be read from any of the DAG nodes. In at least one embodiment, write appliers may be implemented as respective threads or processes that may run at the same hosts at one or more of the DAG nodes. In other embodiments, write appliers may run on different hosts than the DAG nodes. A log entry may also be transmitted eventually to standby node 716, and a replica of it may be stored there after it has been committed, so that the standby node 716 is able to replace a failed node of the DAG quickly if and when such a failover becomes necessary.

A log configuration manager 722 may be responsible for managing changes to DAG configuration (e.g., when nodes leave the DAG due to failures, or join/re-join the DAG) by propagating configuration-delta messages 724 asynchronously to the DAG nodes in the depicted embodiment. An individual configuration-delta message may indicate one or more changes to the DAG configuration that have been accepted or committed at the log configuration manager 722. In some embodiments, individual replication nodes may implement a respective deterministic finite state machine, and the log configuration manager may implement another deterministic finite state machine. The log configuration manager may be implemented as part of the log manager which is also responsible for the optimistic concurrency control protocol described above in one embodiment.

The protocol used for managing DAG configuration changes may be designed to maximize the availability or "liveness" of the DAG in various embodiments. For example, the DAG nodes may not need to synchronize their views of the DAG's configuration in at least some embodiments; thus, the protocol used for transaction record propagation may work correctly even if some of the nodes along a replication pathway have a different view of the current configuration of the DAG than other nodes. In FIG. 72, individual ones of the nodes may update a respective log configuration view 774 (e.g., 774A, 774B, 774C or 774D) based on the particular sequence of configuration-delta messages 724 it has received from the configuration manager 722. It may thus be the case, in one simple example scenario, that one node A of a DAG 740 continues to perform its state transition processing responsibilities under the assumption that the DAG consists of nodes A, B, C and D in that order (i.e., with a replication pathway A-to-B-to-C-to-D), while another node has already been informed as a result of a configuration-delta message that node C has left the DAG, and has therefore updated D's view of the DAG as comprising a changed pathway A-to-B-to-D. The configuration manager may not need to request the DAG nodes to pause processing of transactions and corresponding log entries in at least some embodiments, despite the potentially divergent views of the nodes regarding the current DAG configuration. Thus, the types of "stop-the-world" configuration synchronization periods that may be required in some state replication techniques may not be needed when using replication DAGs of the kind. Although a linear replication pathway is shown in FIG. 7, in general, a replication pathway may include branches at least at some points of time (e.g., during periods when some DAG nodes have received different configuration delta messages than others). Under most operating conditions, the techniques used for propagating DAG configuration change information may eventually result in a converged consistent view of the DAG's configuration at the various member nodes, while minimizing or eliminating any downtime associated with node failures/exits, node joins or node role changes. It is noted that in some embodiments, log entries may be stored without using the kinds of replication DAGs illustrated in FIG. 7.

In at least some embodiments, individual ones of the nodes of a replication DAG may be implemented as a respective process or thread running at a respective host or hardware server. The hosts themselves may be physically dispersed, e.g., within various data centers of a provider network. In one embodiment, a provider network at which a log-based persistent data store is implemented may be organized into a plurality of geographical regions, and each region may include one or more availability containers, which may also be termed "availability zones" herein. An availability container in turn may comprise portions or all of one or more distinct locations or data centers, engineered in such a way (e.g., with independent infrastructure components such as power-related equipment, cooling equipment, or physical security components) that the resources in a given availability container are insulated from failures in other availability containers. A failure in one availability container may not be expected to result in a failure in any other availability container; thus, the availability profile of a given resource is intended to be independent of the availability profile of resources in a different availability container. In some such embodiments, one or more nodes of a replication DAG 740 may be implemented at a different availability container than other nodes of the replication DAG, thereby increasing the robustness and durability of the log.

The use of log-based data store instances of the kind described above at control plane cells may help to increase the probability that VM state change information is not lost or corrupted in various embodiments, and thereby improve the availability and fault resilience of the VCS control plane as a whole. Multiple RPNs and/or multiple reconciliation nodes, capable of taking over the responsibilities of failed RPNs and/or failed reconciliation nodes if needed, may be set up as discussed earlier in some embodiments, further improving the availability profile of individual cells. It is noted that other types of data stores (i.e., data stores that are not necessarily log-based and do not necessarily implement optimistic concurrency control of the kind indicated above) may be used at VCS control plane cells.

Provider Network Environment

Figure 8:
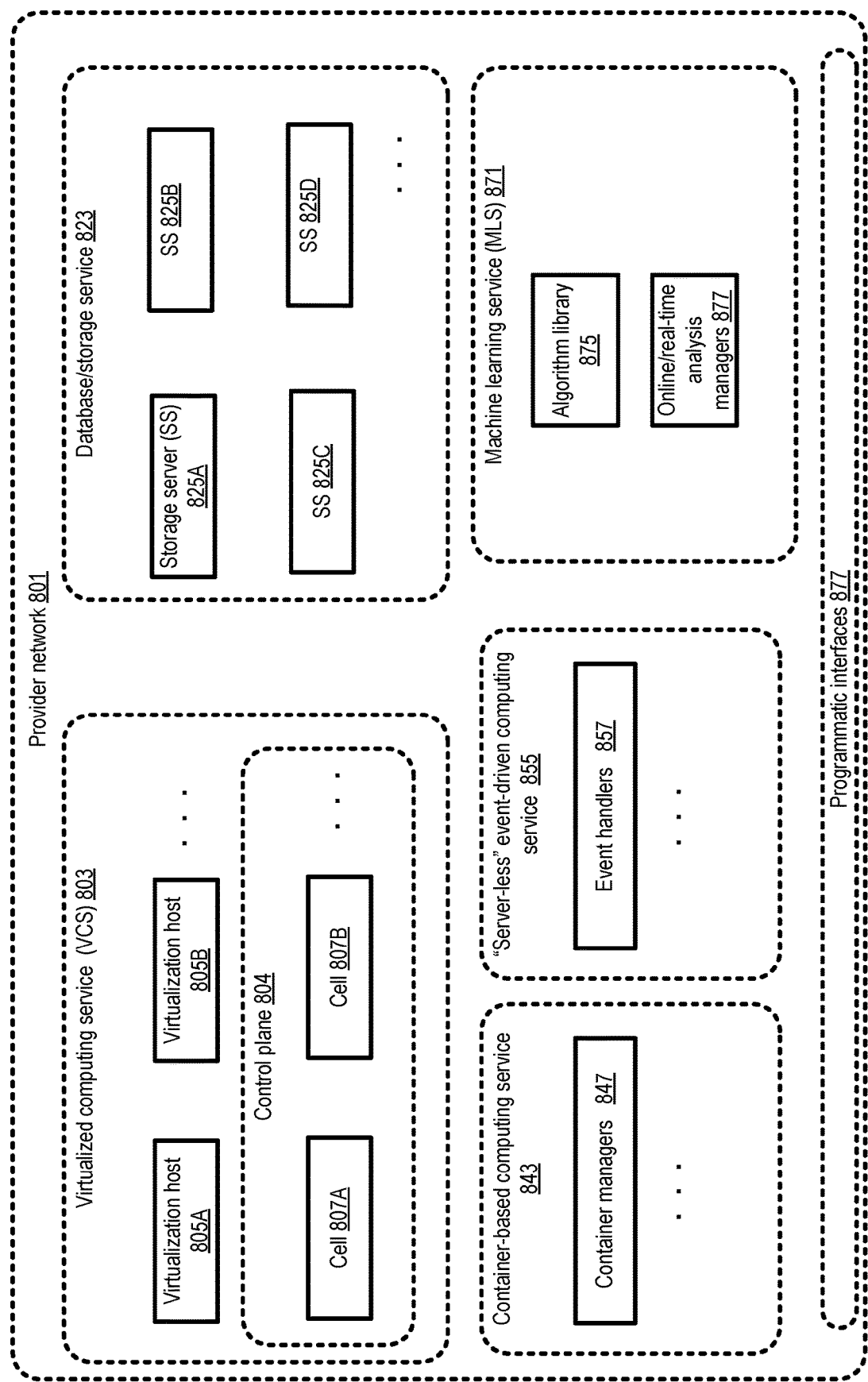
FIG. 8 illustrates a provider network environment at which a virtualized computing service with a cell-based control plane may be implemented, according to at least some embodiments.

FIG. 8 illustrates a provider network environment at which a virtualized computing service with a cell-based control plane may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

In the depicted embodiment, provider network 801 may comprise resources used to implement a plurality of services, including, in addition to a virtual computing service (VCS) 803 with a cell-based control plane 804, a container-based computing service 843, an event-driven computing service 855, a database or storage service 823, and a machine learning service (MLS) 871. Components of a given service may utilize components of other services in the depicted embodiment—e.g., for some machine learning tasks, a component of the machine learning service 871 may utilize virtual machines implemented at virtualization hosts such as 805A or 805B with the help of control-plane cells 807 (e.g., 807A or 807B). Input data, intermediate results, final results and/or other artifacts of various machine learning algorithms or models, may be stored at storage servers 825 (e.g., 825A-825D) of the database or storage service 823 in some embodiments. In some embodiments, a storage service 823 may be utilized by at least some types of virtual machines instantiated at the VCS 803. Individual ones of the services shown in FIG. 8 may implement a respective set of programmatic interfaces 877 which can be used by external and/or internal clients (where the internal clients may comprise components of other services) in the depicted embodiment.

A container-based computing service 843 may enable its clients to use software containers, without having to provision the underlying hardware, virtual machines or operating systems in the depicted embodiment. Software containers are lightweight mechanisms for packaging and deploying applications, providing a consistent portable software environment for applications to easily run and scale. In at least some embodiments, flexible VMs implemented using the cell-based control plane 804 of the VCS 803 may be instantiated for container-based computing service clients. In such embodiments, the clients of the VCS may include container managers 847 of the service 843.

At event-driven computing service 855, resources for requested operations may be provisioned dynamically using VMs created with the help of cells 807, after a request for the operation triggers the provisioning in the depicted embodiment. Such computing services which support dynamic event-driven provisioning may be referred to as "server-less" computing services in some embodiments, as specific (virtual or physical) servers may not have to be acquired in advance of the processing of various client-requested operations. In effect, in some embodiments, clients of an event-driven computing service 855 may package up some program code that is to be run and submit it to the service for execution at resources selected by the service; the clients may not necessarily care where their packaged code is run as long as the results are provided within desired timeframes. As such, for some types of requests directed at service 855, micro-VMs instantiated using control plane 804 of the VCS may be ideal execution platforms. In some embodiments, the event-driven computing service 855 and/or the container-based computing service 843 may be implemented as subcomponents of the VCS 803.

A machine learning service 871 may also utilize the cell-based approach to virtual computing in some embodiments, e.g., to instantiate relatively short-lived virtual machines to run real-time analytics models. Online/real-time analysis managers 877 of the MLS 871 may submit requests to the VCS control plane 804 to obtain virtual machines that can be used to implement algorithms selected from library 875 in such embodiments. The MLS 871 may itself be utilized by the VCS control plane 804 in some embodiments—e.g., metrics collected over time at the cell-based control plane may be analyzed using algorithms from library 875 to determine settings for various tunable parameters of the cells 807.

Methods for Enhancing Virtualized Computing Using Cell-Based Control Plane

Figure 9:
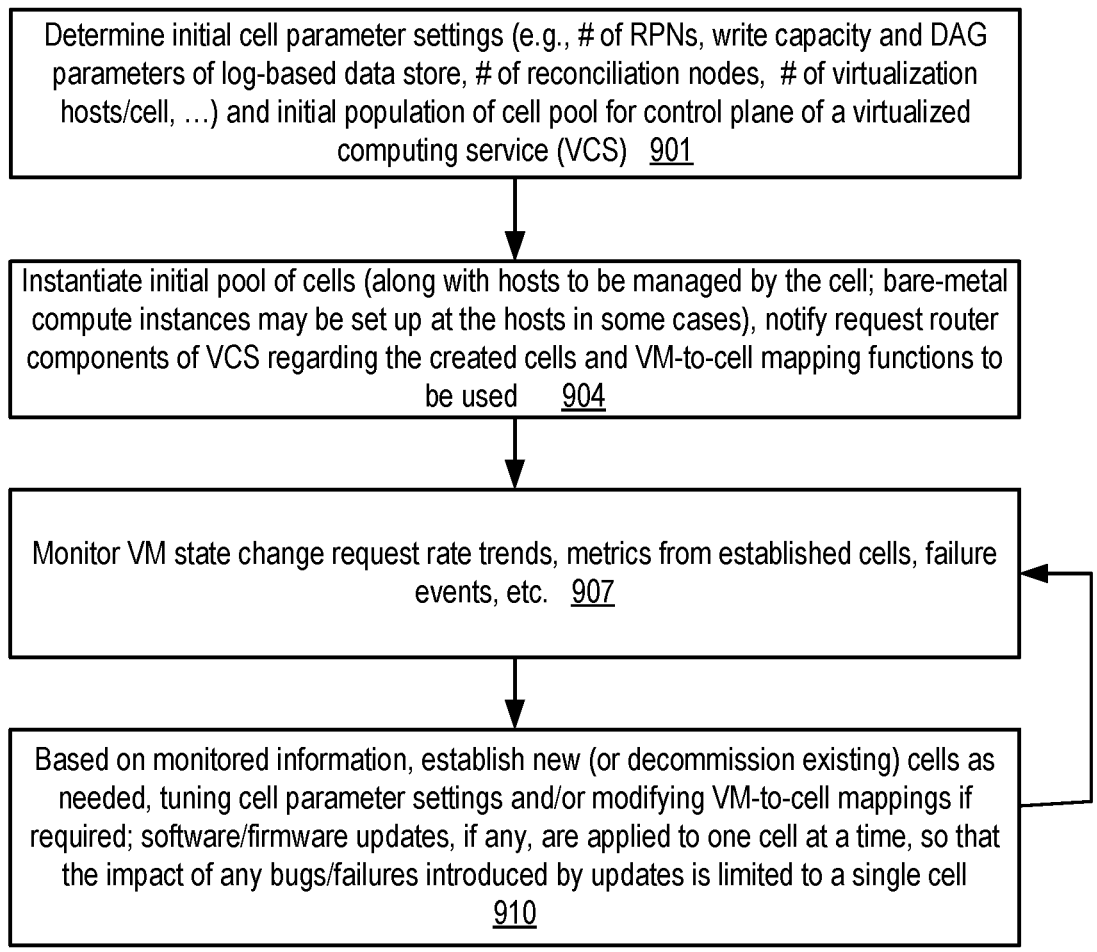
FIG. 9 is a flow diagram illustrating aspects of operations that may be performed to manage a pool of cells of a control plane of a virtualized computing service, according to at least some embodiments.

FIG. 9 is a flow diagram illustrating aspects of operations that may be performed to manage a pool of cells of a control plane of a virtualized computing service, according to at least some embodiments. As shown in element 901, initial cell parameter settings (e.g., the number of RPNs, the write capacity and DAG parameters of the instance of the log-based data store to be used per cell, the number of reconciliation nodes, the number of virtualization hosts per cell, the number of RPNs instantiated at a given host, the number of reconciliation nodes instantiated at a given host, etc.), and an initial population of a cell pool to be used for a control plane of a virtualized computing service (VCS) may be determined, e.g., at a cell pool manager component of the VCS. The DAG parameters may, for example, include the number of replicas of log entries to be stored at respective nodes of a DAG of the kind discussed in the context of FIG. 7. In embodiments in which the RPNs and/or the reconciliation nodes are implemented at virtual machines, the types of virtual machines to be used for the nodes may be selected as well.

Based on the selected settings, the initial pool of cells may be set up (element 904). As part of the process of setting up a given cell, in at least some embodiments one or more virtualization hosts to be managed using the cell may be identified and/or initialized. In one embodiment, for example, a bare-metal compute instance of the kind discussed above, comprising one or more processes including a control plane agent and/or a VM configuration daemon, may be established on a virtualization host as part of the setup of the cell. In other embodiments, bare-metal compute instances may be set up later at the virtualization hosts, e.g., by one or more components of the cell itself. In some embodiments, bare-metal compute instances may not be set up at the virtualization hosts. In at least some embodiments, request router components of the VCS may be notified regarding the cells of the pool, enabling communication channels to be established between the request routers and the RPNs of the cells. In one embodiment, a mapping function to be used to determine (e.g., based on properties of requested VMs) which particular VM should be used for a given VM configuration request may also be indicated to the request routers.

A number of factors may be taken into account to determine if and when changes to the pool configuration may be needed in the depicted embodiment. A cell pool manager may, for example, monitor VM state change request rate trends, metrics from established cells, failure events, etc. (element 907).

Based at least in part on the monitored information, the cell pool population and/or the configurations of individual cells may be changed in the depicted embodiment (element 910). New cells may be established, for example, or existing cells may be decommissioned, based on any combinations of various triggering conditions, such as detecting that an arrival rate of requests for virtual machine state changes exceeds a threshold, determining that a resource utilization rate of an existing cell or cell(s) exceeds a threshold, or detecting a failure at some existing cell(s). Cell parameter settings may be changed, and/or VM-to-cell mapping functions may be modified if required in the depicted embodiment. It is noted that the internal configuration of a given cell (e.g., how many RPNs it has, how many virtualization hosts it manages, etc.) may differ from the internal configuration of at least some other cells in some embodiments. In various embodiments, software/firmware updates, if any, for various components of the cells (such as RPNs, reconciliation nodes, data store instances, and the like) may be applied to one cell at a time, so that the impact of any bugs/failures introduced by updates is limited to a single cell as far as possible. Monitoring operations (corresponding to element 907) and responsive adjustments (corresponding to element 910) may be repeated as needed in the depicted embodiment.

Figure 10:
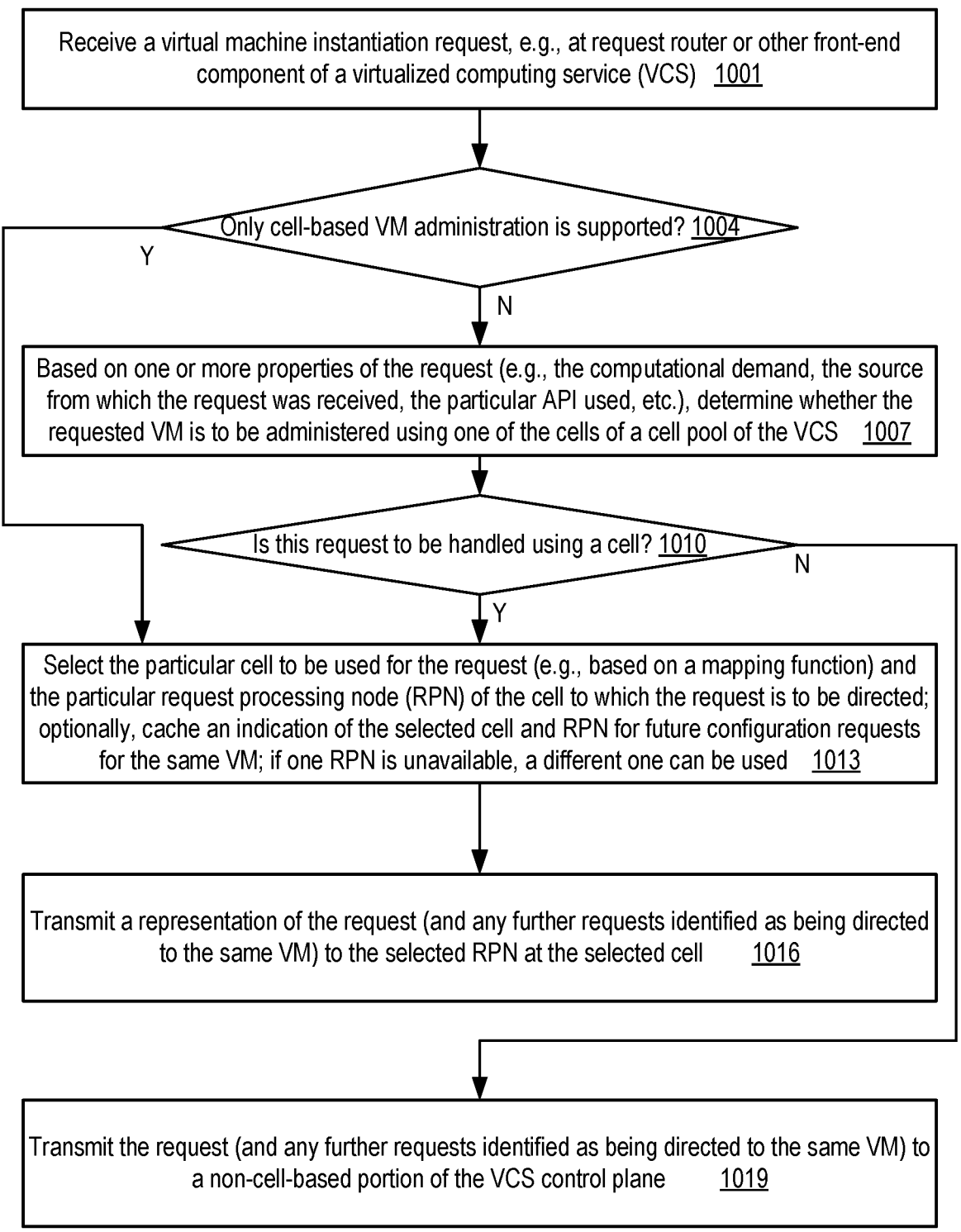
FIG. 10 is a flow diagram illustrating aspects of operations that may be performed at a request routing layer of a virtualized computing service, according to at least some embodiments.

FIG. 10 is a flow diagram illustrating aspects of operations that may be performed at a request routing layer of a virtualized computing service, according to at least some embodiments. As shown in element 1001, a virtual machine instantiation request may be received at a VCS, e.g., at request router or other front-end component. The client submitting such a request may in some cases be a component of another network-accessible service such as a container-based computing service or an event-driven computing service of the kind mentioned earlier. In other cases, requests to instantiate virtual machines may be received from entities that are not part of a service as such, such as external customers of the VCS.

Cell-based control planes may be used in a variety of scenarios as mentioned earlier. In some embodiments, all VMs implemented at the VCS may use the cell-based control plane; in other embodiments, some types or sizes of VMs may be implemented using other parts of the VCS control plane that are not organized as a collection of autonomous cells. In embodiments in which only cell-based VM administration is supported (as determined in operations corresponding to element 1004), the particular cell to be used for the request may be selected (e.g., based on a mapping function supplied by a cell pool manager) (element 1013). In addition, the particular request processing node (RPN) of the cell to which the request is to be directed may be selected (e.g., using random selection among the RPNs of the selected cell). In at least some embodiments, the different RPNs within a given cell may be functionally interchangeable from the perspective of the request routing layer—e.g., if communication to one of the RPNs is disrupted or the RPN becomes unavailable, a different RPN may be used to process a VM configuration change request. Optionally, an indication of the selected cell and RPN may be cached at the request processing layer for future configuration requests for the same VM in some embodiments. Note that in embodiments in which all VMs are administered using a cell-based control plane, operations corresponding to element 1004 (and elements 1007, 1010, and 1019) may not be implemented.

In an embodiment in which some VMs are administered using cells, and others are not, a determination may have to be made whether the received request is to be administered using a cell or not. As indicated in element 1007, such a determination may be made based at least in part on one or more properties of the request (e.g., the computational demand, the source from which the request was received, the particular API used, etc.) in some embodiments. For example, in one embodiment, a decision to use a cell may be made if a resource demand (for processing power, memory and/or storage) of the request is below a pre-determined threshold. The threshold itself may be a tunable parameter of the VCS control plane in some embodiments. If the conclusion is that a cell is to be used (corresponding to the "Y" or "yes" output of element 1010), the cell and RPN to be employed may be selected in operations corresponding to element 1013 as discussed above. The request for the VM (and any further requests identified as being directed to the same VM) may be transmitted to the selected RPN at the selected cell (element 1016) in the depicted embodiment. In some embodiments, an internal representation of the request may be transmitted to the selected RPN; in other embodiments, at least a portion of the original request may be transmitted to the selected RPN. If, in contrast, a determination is made that the request is not to be handled using a cell, the request (and any further requests identified as being directed to the same VM) may be transmitted to a non-cell-based portion of the VCS control plane (element 1019), such as a standardized VM management layer in various embodiments.

Figure 11:
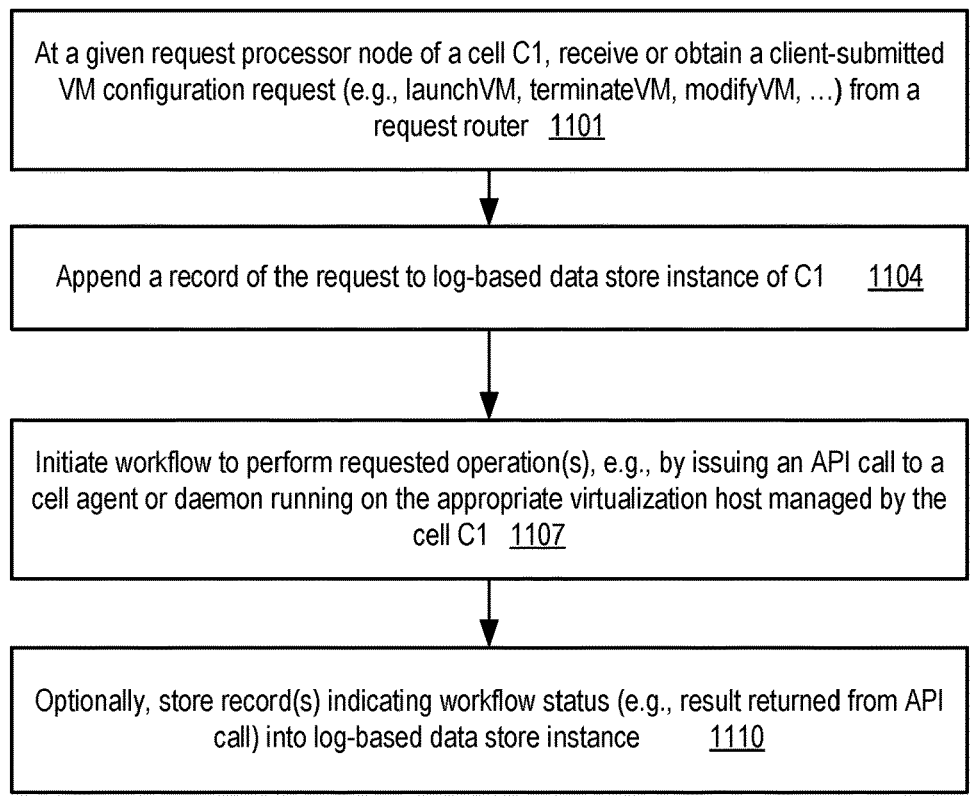
FIG. 11 is a flow diagram illustrating aspects of operations that may be performed at a request processing node of a control plane cell of a virtualized computing service, according to at least some embodiments.

FIG. 11 is a flow diagram illustrating aspects of operations that may be performed at a request processing node of a control plane cell of a virtualized computing service, according to at least some embodiments. As shown in element 1101, a client-submitted VM configuration request may be received or obtained at a particular request processing node of a cell C1, e.g., from a request router in the depicted embodiment. In some embodiments, the request may be transmitted to the request processing node, e.g., by an intermediary such as a request router; in other embodiments, the request processing node may obtain or extract a request more actively, e.g., by querying the intermediary. Any of several types of requests which involve state changes, such as a request to launch a VM, terminate a VM, or modify a running VM may be received/obtained in various embodiments. (In addition, in at least one embodiment, read-only requests which do not involve making state changes, such as a request to provide status information about a VM may also be received or obtained at a request router in various embodiments. To process such read-only requests, the RPN may in turn read contents of the local instance of the data store used to save state information in some embodiments, and provide the information to the requester.)

A record indicating the VM configuration request may be stored in a local instance of a persistent data store in various embodiments by the RPN (element 1104). A workflow to perform the requested operation(s) may then be initiated in the depicted embodiment (element 1107). The workflow may comprise issuing an API call to a control plane agent and/or daemon running in the appropriate virtualization host managed by the cell C1 in some embodiments. The API call may, for example, indicate various parameters or properties of the client's requested operation(s) (e.g., launching a virtual machine, terminating a virtual machine, etc.) in a format understood by the control plane agent or daemon. In one embodiment, the agent or daemon may itself be running as part of another virtual machine or bare-metal compute instance as discussed earlier. Optionally, in some embodiments, one or more records indicating the workflow status (e.g., results returned from the API call) may be stored in the log-based data store instance. The particular virtualization host to be used for a given request to instantiate a VM may be selected in various embodiments based on the available resource capacity of the host, relative to the requirements of the VM being instantiated. As mentioned earlier, in some embodiments in which a cell-based VCS control plane is being used, clients may specify resource requirements for flexible VMs over continuous ranges, thereby potentially enabling higher levels of oversubscription and utilization of the virtualization hosts than if VMs from a discrete set of standardized VM types were the only supported VMs.

Figure 12:
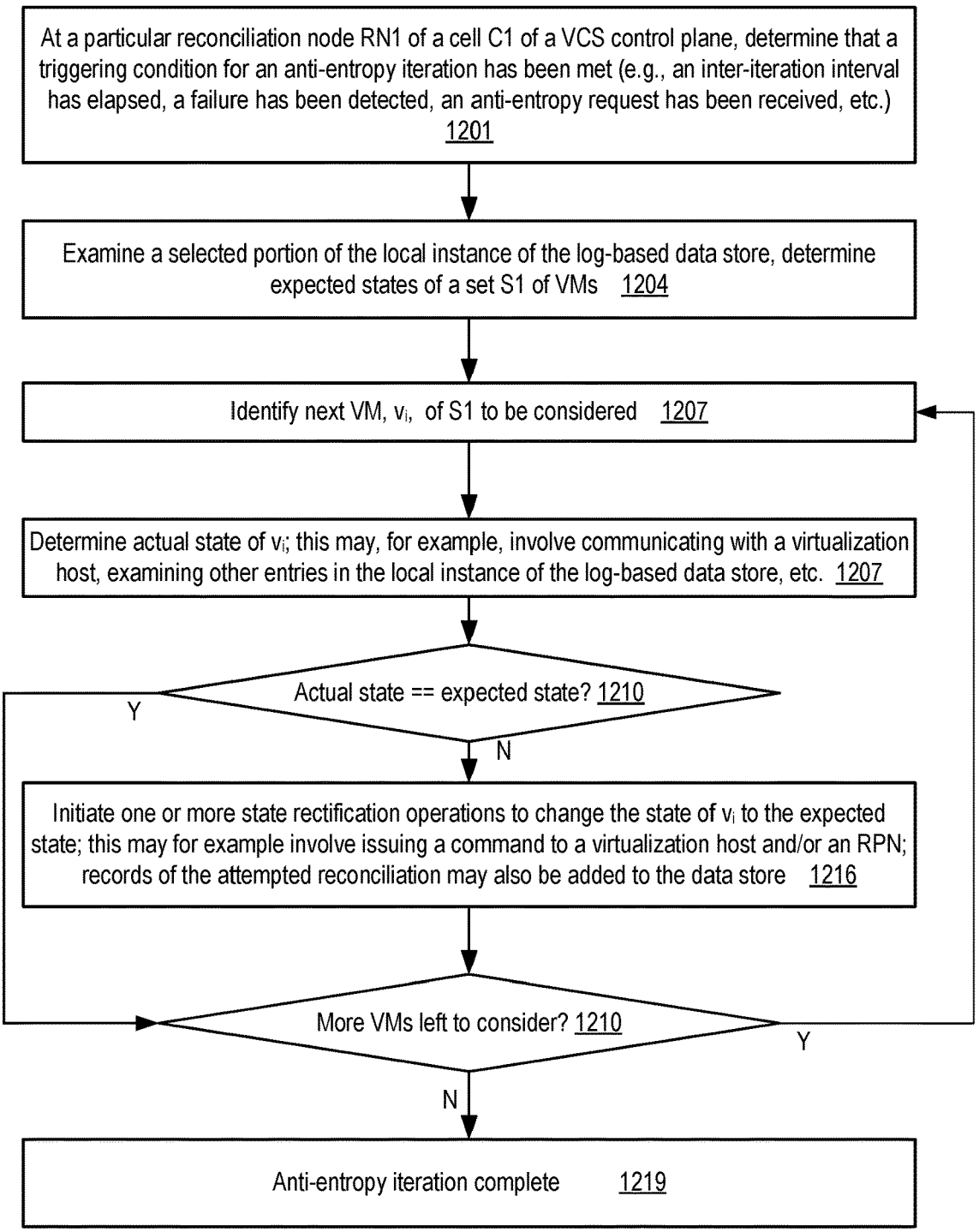
FIG. 12 is a flow diagram illustrating aspects of operations that may be performed at a reconciliation node of a control plane cell of a virtualized computing service, according to at least some embodiments.

FIG. 12 is a flow diagram illustrating aspects of operations that may be performed at a reconciliation node of a control plane cell of a virtualized computing service, according to at least some embodiments. As shown in element 1201, at a particular reconciliation node RN1 of a cell C1 of a VCS control plane, a determination may be made that a triggering condition for an anti-entropy iteration has been met. A number of factors may influence the decision to perform an anti-entropy iteration in different embodiments. For example, such iterations may be initiated at regular intervals by default, and a determination may be made that the inter-iteration interval has elapsed. In some embodiments, an indication of a failure may trigger an anti-entropy iteration, or an anti-entropy request may be received, etc.

In the depicted embodiment, a selected portion of the local instance of the log-based data store may be examined to determine respective expected states of a set S1 of VMs being managed at the cell (element 1204). If, for example, an entry in the log indicates that a request to launch a VM was received, and there are no entries indicating that the VM was terminated, the expected state of the VM may be "running". In one implementation, a commit sequence number of the last log entry that was examined in a previous iteration may be stored as a marker to indicate the starting point of the portion to be examined in the current iteration. The set S1 may, for example, include any of the VMs for which a state change request was stored in the examined portion of the log.

The set of VMs of S1 may be processed iteratively to verify the respective fulfilment statuses of requests associated with the individual VMs, and/or identify potential problems associated with the functioning or performance of the VMs in the depicted embodiment. The next VM, $v_i$, of S1 to be considered may be identified in operations corresponding to element 1207. The actual state of $v_i$ may be determined (element 1207); this may, for example, involve communicating with a virtualization host, examining other entries in the local instance of the log-based data store which may indicate monitoring results pertaining to $v_i$, and/or other operations in different embodiments.

If the actual state is the expected state (as determined in operations corresponding to element 1210), no reconciliation or rectification may be required with respect to $v_i$, so additional VMs in S1 may be considered (element 1210), if any. If the actual state differs from the expected state (as also determined in operations corresponding to element 1210), one or more state rectification operations may be initiated by the reconciliation node to attempt to change the state of $v_i$ to the expected state (element 1213). This may, for example, involve issuing a command to a virtualization host and/or an RPN in various embodiments. In some embodiments, the actual and expected states may be considered qualitatively (e.g., is the VM up and running after an API to launch the VM was issued?), while in other embodiments more quantitative criteria may be used to define actual versus expected states (e.g., is the VM responding to network requests within X milliseconds as expected/desired?). In some embodiments, records of the attempted reconciliation/rectification operations may also be added to the data store. If there are no more VMs left to consider in set S1 (as determined in operations corresponding to element 1210), the iteration may be complete (element 1213). Otherwise, the actual and expected states of the next VM may be compared, and operations corresponding to element 1207 onwards may be repeated in the depicted embodiment.

It is noted that in various embodiments, some of the operations shown in FIG. 9, FIG. 10, FIG. 11 and/or FIG. 12 may be implemented in a different order than that shown in the figure, or may be performed in parallel rather than sequentially. Additionally, some of the operations shown in FIG. 9, FIG. 10, FIG. 11 and/or FIG. 12 may not be required in one or more implementations.

Use Cases

The techniques described above, of utilizing replicable autonomous cells to administer virtual machines at a network-accessible virtualized computing service may be extremely beneficial for a number of reasons in various scenarios. Very large numbers (e.g., millions) of virtual machines may have to be managed concurrently at such services, and the individual virtual machines may vary greatly with respect to average lifetimes, resource requirements and the like. If a monolithic control plane architecture is used, a bug introduced by a software upgrade to a control plane component may potentially negatively impact, or even cause downtimes for, applications of a large number of clients of the virtualization service. Furthermore, as demand for virtual machines (including new types of virtual machines) increases over time, it may be hard to adapt the monolithic control plane. In contrast, in scenarios in which new control plane cells of the kind described herein can be replicated fairly easily, it may be possible to isolate the impact of any bugs or failures in the control plane components to a small subset of client applications at a time, and to adapt gracefully as the overall workload being handled by the virtualized computing service increases.

Illustrative Computer System

Figure 13:
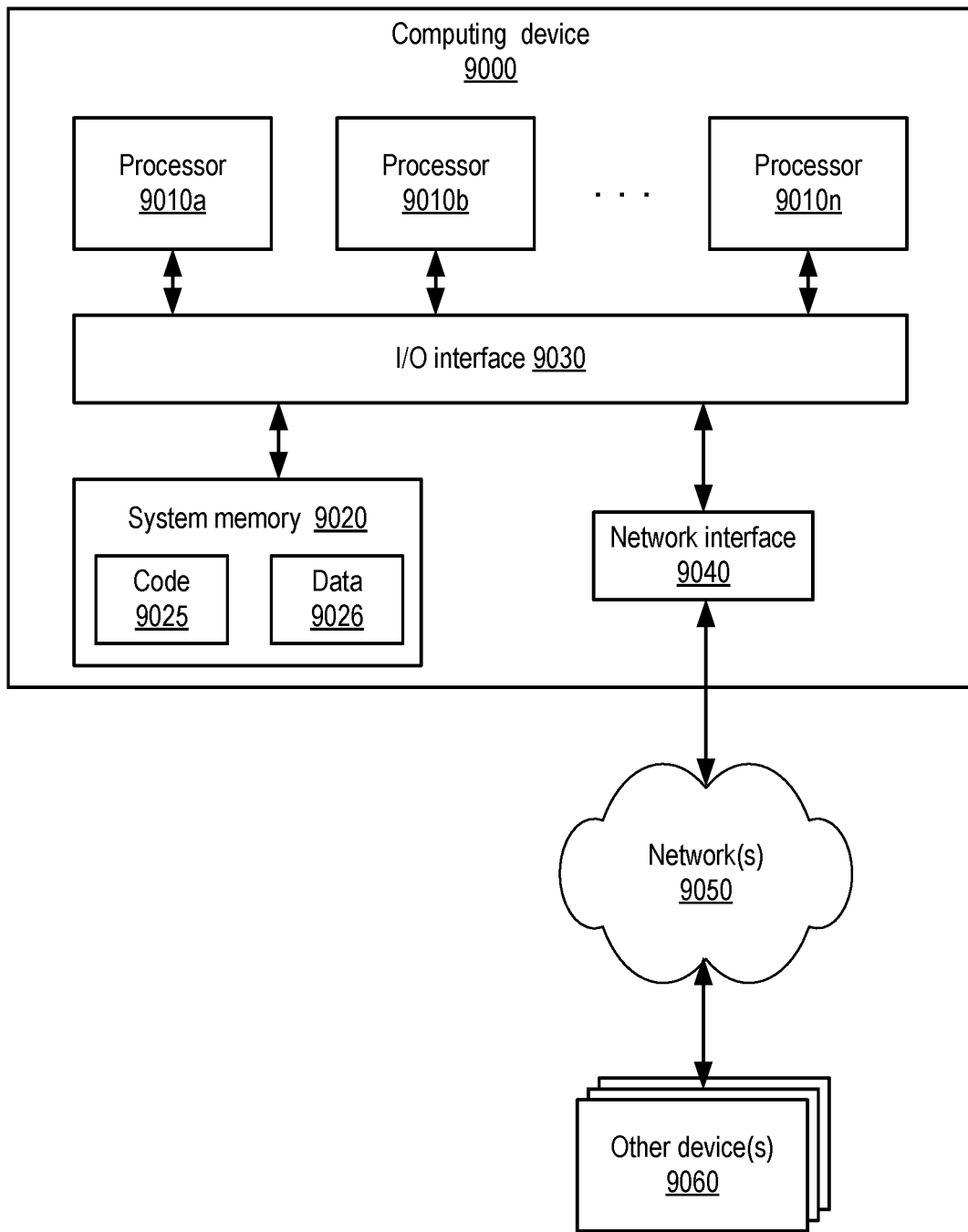
FIG. 13 is a block diagram illustrating an example computing device that may be used in at least some embodiments.

In at least some embodiments, a server that implements a portion or all of one or more of the technologies described herein, including the various components of the control plane and/or data plane of a virtualized computing service, may include a general-purpose computer system that includes or is configured to access one or more computer-accessible media. FIG. 13 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example.

Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 12, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 12 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices comprising one or more respective processors and memory and configured to implement one or more request routers of a virtualized computing service, including a first request router implemented at a first set of the one or more computing devices; and
one or more other computing devices comprising one or more other respective processors and memory and configured to implement a plurality of autonomous cells of a control plane layer of the virtualized computing service, including a first autonomous cell, wherein the first autonomous cell is implemented at a second set of the one or more other computing devices, and wherein the first autonomous cell comprises (a) one or more request processing nodes including a first request processing node, (b) a first instance of a data store, and (c) metadata identifying one or more virtualization hosts to be administered by the first autonomous cell, including a first virtualization host comprising an offloaded virtualization manager component;
wherein the first set of the one or more computing devices includes instructions that when executed on one or more processors of the first set of the one or more computing devices causes the first set of the one or more computing devices to:
determine, based at least in part on a computational demand indicator of a first request for a first virtual machine, that at least a subset of administrative operations associated with the first virtual machine is to be processed at the control plane layer;
select, based at least in part on a set of properties of the first request, the first autonomous cell to fulfill the first request; and
wherein the second set of the one or more other computing devices includes instructions that when executed on one or more processors of the second set of the one or more other computing devices cause the second set of the one or more other computing devices to:
initiate, by the first request processing node, at least a portion of a workflow to configure the first virtual machine on the first virtualization host using the offloaded virtualization manager component, wherein the workflow comprises storing, in the first instance of the data store, a record indicating the first request.

2. The system as recited in claim 1, wherein the first cell comprises a first reconciliation node, wherein the second set of the one or more other computing devices include instructions that when executed on the one or more processors of the second set of the one or more other computing devices cause the second set of the one or more other computing devices to:
determine, by the first reconciliation node, that a status of a second request associated with a second virtual machine does not meet a criterion; and initiate, by the first reconciliation node, one or more rectification operations to modify the status of the second request.

3. The system as recited in claim 2, wherein to determine that the status of the second request does not meet the criterion, the first reconciliation node: (a) examines the first instance of the data store or (b) transmits a query to one or more virtualization hosts administered by the first cell.

4. The system as recited in claim 1, wherein selection of the first cell is based at least in part on one or more of: (a) a mapping of a requested networking-related property of the first virtual machine to the first cell, or (b) a determination that an available resource capacity of the first cell exceeds a threshold.

5. The system as recited in claim 1, wherein the first request is received from a customer of the virtualized computing service, wherein the first virtualization host comprises a bare-metal compute instance, wherein the workflow comprises invoking an application programming interface implemented by a first process of one or more processes of the bare-metal compute instance, and wherein, in response to the invocation of the application programming interface, the one or more processes launch the first virtual machine.

6. A method, comprising:
performing, by one or more computing devices:
obtaining, at a virtualized computing service, a first request for a first virtual machine;
selecting, based at least in part on one or more properties of the first request, a first cell of two or more cells of a control plane of the virtualized computing service to fulfill the first request, wherein individual ones of the two or more cells comprise:
(a) one or more request processing nodes,
(b) an instance of a data store, and
(c) metadata identifying a group of one or more virtualization hosts to be administered by the respective cell; and
initiating, by a first one of the one or more request processing nodes of the first cell, at least a portion of a workflow to utilize a first one of the one or more virtualization hosts of the first cell to instantiate the first virtual machine, wherein the workflow comprises storing, in the instance of the data store of the first cell, a record indicating the first request.

7. The method as recited in claim 6, wherein the first cell comprises a first reconciliation node, the method further comprising performing, by one or more computing devices:
determining, by the first reconciliation node, that a status of a second request associated with a second virtual machine does not meet a criterion; and
initiating, by the first reconciliation node, one or more rectification operations to modify the status of the second request.

8. The method as recited in claim 7, wherein determining that the status of the second request does not meet the criterion comprises one or more of: (a) examining the instance of the data store of the first cell or (b) transmitting a query to one or more virtualization hosts administered by the first cell.

9. The method as recited in claim 7, wherein a first rectification operation of the one or more rectification operations comprises one or more of: (a) causing an attempt to instantiate the second virtual machine, or (b) causing an attempt to terminate the second virtual machine.

10. The method as recited in claim 6, further comprising performing, by one or more computing devices:
in response to detecting that one or more triggering conditions are satisfied, establishing an additional cell of the control plane, wherein detecting a first triggering condition of the one or more triggering conditions comprises at least one of: (a) detecting that an arrival rate of requests for virtual machine state changes exceeds a threshold, (b) determining that a resource utilization of the first cell exceeds a threshold, or (c) detecting a failure at the first cell.

11. The method as recited in claim 6, further comprising performing, by one or more computing devices:
implementing, using the first cell, one or more requested state changes of the first virtual machine, without interacting with another cell of the control plane.

12. The method as recited in claim 6, wherein the one or more properties of the first request comprises a first resource demand indicator, the method further comprising performing, by one or more computing devices:
prior to selecting the first cell, determining, based at least in part on the first resource demand indicator, that the first request is to be fulfilled using one or more cells of the control plane; and
determining, based at in part on a second resource demand indicator of a second request for a second virtual machine, that the second request is to be fulfilled using a standardized-virtual-machine management layer of the control plane.

13. The method as recited in claim 12, wherein determining that the first request is to be fulfilled using the one or more cells comprises determining that a demand of the first request for a first resource is below a threshold.

14. The method as recited in claim 6, wherein selecting the first cell is based at least in part on one or more of: (a) a mapping of a requested networking-related property of the first virtual machine to an identifier of the first cell, or (b) a determination that an available resource capacity of the first cell exceeds a threshold.

15. The method as recited in claim 6, wherein the first request is received from a customer of the virtualized computing service, the method further comprising performing, by the one or more computing devices:
establishing, by one or more components of the control plane, a bare-metal compute instance at the first one of the virtualization hosts, wherein the bare-metal compute instance comprises one or more processes, wherein the workflow to utilize the first one of the virtualization hosts comprises invoking an application programming interface implemented by a first process of the one or more processes, and wherein, in response to the invocation of the application programming interface, the one or more processes launch the first virtual machine on behalf of the customer.

16. The method as recited in claim 6, wherein the first cell comprises a plurality of request processing nodes including second request processing host, wherein the first one of the request processing nodes is implemented at a first host, wherein the second request processing host is implemented at a second host, the method further comprising:
in response to detecting that the first one of the request processing nodes is unavailable, transmitting, to the second request processing node by a request router of the virtualized computing service, a second request associated with the first virtual machine.

17. A method, comprising:
performing, by one or more computing devices:
instantiating, at a virtualization host to be managed by a first cell of two or more cells of a control plane of a virtualized computing service, a bare-metal compute instance comprising one or more processes, wherein individual ones of the two or more cells comprise:
- one or more request processing nodes,
- an instance of a data store, and
- metadata identifying a group of one or more virtualization hosts to be administered by the respective cell;

obtaining, at a first one of the request processing nodes of the first cell, a first request to launch a first virtual machine on behalf of a client of the virtualized computing service;

providing an indication, by the first one of the request processing nodes to a first process of the one or more processes, of the first request; and launching, by the one or more processes in response to the indication, the first virtual machine at the virtualization host on behalf of the client.

18. The method as recited in claim 17, further comprising performing, by the one or more computing devices:

determining, based at least in part on an estimate of an expected rate of virtual machine state changes requested by clients of the virtualized computing service, that one or more additional cells for processing control plane operations are to be configured at the virtualized computing service, wherein the control plane comprises one or more cell-based layers, and wherein a first cell-based layer of the one or more cell-based layers comprises the two or more cells;

initiating establishment of an additional cell of the one or more additional cells, wherein the establishment comprises (a) configuring one or more request processing nodes, (b) configuring an instance of a data store, and (c) identifying one or more additional virtualization hosts to be managed by the additional cell; and providing an indication of the additional cell to one or more request routing components of the virtualized computing service.

19. The method as recited in claim 18, wherein the establishment of the additional cell comprises:

configuring a first reconciliation node to verify, based at least in part on contents of the instance of the data store, a status of one or more virtual machine configuration change requests.

20. The method as recited in claim 17, wherein the first virtualization host comprises an offloaded virtualization manager component, wherein the offloaded virtualization manager component is accessible from a processor of the first virtualization host via a peripheral interconnect.

* * * * *